US011096379B2

(12) United States Patent
Oh

(10) Patent No.: US 11,096,379 B2
(45) Date of Patent: Aug. 24, 2021

(54) BEEKEEPING CONTAINER

(71) Applicant: Oknam Oh, Sangju-si (KR)

(72) Inventor: Oknam Oh, Sangju-si (KR)

( * ) Notice: Subject to any disclaimer, the term of this patent is extended or adjusted under 35 U.S.C. 154(b) by 363 days.

(21) Appl. No.: 16/320,535

(22) PCT Filed: Jan. 25, 2018

(86) PCT No.: PCT/KR2018/001123
§ 371 (c)(1),
(2) Date: Jan. 25, 2019

(87) PCT Pub. No.: WO2018/139872
PCT Pub. Date: Aug. 2, 2018

(65) Prior Publication Data
US 2019/0269106 A1    Sep. 5, 2019

(30) Foreign Application Priority Data
Jan. 26, 2017   (KR) .................. 10-2017-0012912

(51) Int. Cl.
*A01K 47/06*    (2006.01)
*A01K 55/00*    (2006.01)
(Continued)

(52) U.S. Cl.
CPC .............. *A01K 55/00* (2013.01); *A01K 51/00* (2013.01); *B65D 88/12* (2013.01); *B65D 90/00* (2013.01); *B65D 90/0053* (2013.01)

(58) Field of Classification Search
CPC ........ A01K 55/00; A01K 51/00; A01K 47/00; B65D 88/127; B65D 88/128;
(Continued)

(56) References Cited

U.S. PATENT DOCUMENTS 4,033,620 A * 7/1977 Blake ..................... A01K 55/00
296/24.31
8,602,837 B1 * 12/2013 Allan ................... A01K 67/033
449/1
(Continued)

FOREIGN PATENT DOCUMENTS

CN    104261005 A    1/2015
CN    105379645 A    3/2016
(Continued)

OTHER PUBLICATIONS

CN104261005 Machine translation (Year: 2015).*
International Search Report for PCT/KR2018/001123 dated May 23, 2018 from Korean Intellectual Property Office.

*Primary Examiner* — Son T Nguyen
(74) *Attorney, Agent, or Firm* — Revolution IP, PLLC

(57) ABSTRACT

The present invention provides a beekeeping container, and a configuration of the present invention includes a shelf frame which is rotatably coupled to a container body via a frame hinge portion; and a beekeeping barrel shelf which is coupled to the shelf frame via the hinge portion to be erected in a vertical direction based on the hinge portion when the shelf frame is unfolded and erected based on the frame hinge portion. The shelf frames are provided on both left and right sides of the container body, respectively, the pair of shelf frames are provided on the container body, and the beekeeping barrel shelf is mounted on the pair of shelf frames via the hinge portion.

3 Claims, 17 Drawing Sheets

(51) Int. Cl.
*B65D 90/00* (2006.01)
*A01K 51/00* (2006.01)
*B65D 88/12* (2006.01)

(58) Field of Classification Search
CPC .. B65D 88/129; B65D 88/12; B65D 90/0046; B65D 90/0053
See application file for complete search history.

(56) References Cited

U.S. PATENT DOCUMENTS

| | | | | |
|---|---|---|---|---|
| 9,016,490 | B1* | 4/2015 | Higgins | B65D 88/522 |
| | | | | 220/1.5 |
| 2004/0140305 | A1* | 7/2004 | Okumura | B65D 88/524 |
| | | | | 220/6 |
| 2015/0049919 | A1* | 2/2015 | Humal | G06T 7/0012 |
| | | | | 382/110 |
| 2020/0315143 | A1* | 10/2020 | Radzyner | A01K 51/00 |
| 2020/0323177 | A1* | 10/2020 | Drennan | A01K 1/0047 |

FOREIGN PATENT DOCUMENTS

| | | | |
|---|---|---|---|
| KR | 10-0708334 | B1 | 4/2007 |
| KR | 10-1090622 | B1 | 12/2011 |
| KR | 10-2014-0007723 | A | 1/2014 |
| KR | 10-1453510 | B1 | 10/2014 |
| KR | 10-1671617 | B1 | 11/2016 |
| KR | 10-2016-0149047 | A | 12/2016 |

* cited by examiner

BEEKEEPING CONTAINER

TECHNICAL FIELD

The present invention relates to a beekeeping container and more particularly, to a planar-movable beekeeping container with a new configuration so as to sufficiently carry beekeeping barrels by a desired number. The present invention relates to a movable beekeeping container to be unfolded in the same form as a plain and a new invention capable of smoothly collecting and primarily examining honey. Further, the present invention relates to a planar-movable beekeeping container capable of securing a passage of an operator while preventing bees from being disturbed when entering a beekeeping barrel.

BACKGROUND ART

Beekeeping is an operation of cultivating honey to obtain honey. The beekeeping operation is to allow the bees to build honeycombs in a plurality of comb foundations put into a beekeeping barrel to obtain honey from these honeycombs. Meanwhile, in the beekeeping operation, the beekeeping barrel is installed by moving to a blooming place at the time of blooming of a honey plant, that is, a flower that can collect honey to allow the bees to collect the honey. As such, loading or unloading the beekeeping barrel in a moving vehicle frequently occurs due to characteristics of the beekeeping operation of finding and moving the honey plant. In addition, the beekeeping barrel is loaded and moved on the vehicle so that the beekeeping barrel is installed at a desired place to be installed, thereby installing the beekeeping barrel.

However, in the related art, even if the beekeeping barrel is loaded on the vehicle, there is a limit in carrying a desired number of beekeeping barrels due to the lack of the loading space, and it is necessary to perform the carrying operation of the beekeeping barrel many times such that the vehicle is driven many times as many times as the beekeeping barrel is desired. As a result, there are various problems such as a troublesome operation and a waste of installation time of the beekeeping barrel and a lot of logistics costs. That is, there is a disadvantage that the time and effort for transporting the beekeeping barrel needs to be increased in the related art.

PRIOR ART DOCUMENT

Patent Document (Patent Document 1) Korean Patent Registration No. 10-1090622 (registered on Nov. 30, 2011)
(Patent Document 2) Korean Patent Registration No. 10-1453510 (registered on Oct. 15, 2014)
(Patent Document 3) Korean Patent Registration No. 10-1671617 (registered on Oct. 26, 2016)

DISCLOSURE

Technical Problem

The present invention has been developed in order to solve the above-mentioned problems, and an object of the present invention is to provide a beekeeping container with a new configuration capable of reducing the effort and time in transportation and installation of a beekeeping barrel by sufficiently carrying a desired number of beekeeping barrels.

Technical Solution

According to the present invention to solve the above problems, there is provided a beekeeping container including: a shelf frame which is rotatably coupled to a container body via a frame hinge portion; and a beekeeping barrel shelf which is coupled to the shelf frame via the hinge portion to be erected in a vertical direction based on the hinge portion when the shelf frame is unfolded and erected based on the frame hinge portion.

The shelf frames may be provided on both left and right sides of the container body, respectively, the pair of shelf frames may be provided on the container body, and the beekeeping barrel shelf may be mounted on the pair of shelf frames via the hinge portion.

The beekeeping barrel shelf may be mounted on the shelf frame in multiple stages.

A bottom panel may be provided in the container body, a receiving space mounted with the beekeeping barrel may be secured in the bottom panel, and the beekeeping barrel shelf may be disposed above the beekeeping barrel received in the receiving space.

A slide shelf drawn out from the receiving space secured above the bottom panel may be further provided in the container body and the beekeeping barrel may be mounted on the slide shelf.

Advantageous Effects

According to the present invention, since the beekeeping barrel is mounted on the beekeeping barrel shelf by unfolding the shelf frame and the beekeeping barrel shelf and the beekeeping barrel may be vertically erected by erecting the shelf frame again, a large number of beekeeping barrels may be loaded and carried as compared with the related art, and thus, it is possible to solve various limitations of carrying a desired number of beekeeping barrels due to the lack of a loading space. That is, it is possible to solve many problems that the carrying of the beekeeping barrels needs to be performed many times like driving the vehicle many times capable of carrying a desired number of beekeeping barrels, inconvenience of the operation and waste of installation time of the beekeeping barrels are caused.

The present invention is a planar-movable beekeeping container capable of moving equally with a plain. The shelf frame as a main part is unfolded and used as it is, and may be unfolded in the same form as a plain. The present invention makes it possible to smoothly collect and primarily examining honey. The primary examination is to examine comb foundations included in the beekeeping barrel and may be smoothly and easily performed by performing an operation such that an operator moves in the plain.

In addition, the present invention is configured so that passages are secured on the side of a stoma 2H, which is a passage through which the bees pass, so that the bees may be prevented from being disturbed when the bees enter and exit the beekeeping barrels, and the operator performs the beekeeping operation while moving through the passages, so that the operator may more conveniently operate.

It should be understood that there are various effects other than the above-described effects of the present invention, and that the above-described effects correspond to the main effects of the present invention.

MODES OF THE INVENTION

Figure 1:
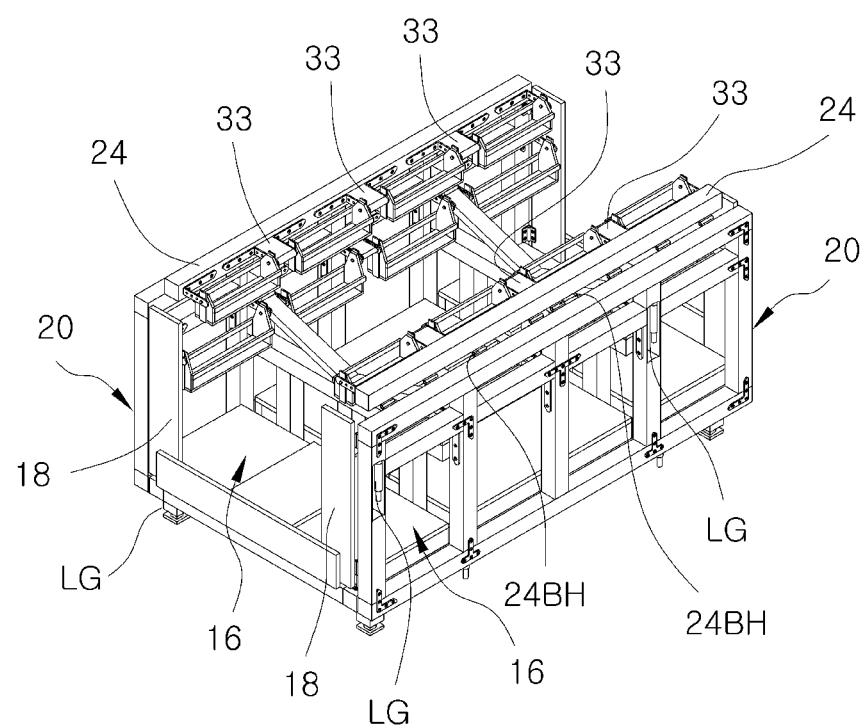
FIG. 1 is a perspective view showing a configuration of a main part of a beekeeping container according to the present invention.

Hereinafter, preferred embodiments of the present invention will be described in detail with reference to the accompanying drawings. Objects, features and advantages of the present invention will be more easily understood with reference to the accompanying drawings and the following detailed description. In the following description, a detailed explanation of related known configurations or functions may be omitted to avoid obscuring the subject matter of the present invention.

In describing the components of the embodiments of the present invention, terms including first, second, A, B, (a), (b), and the like may be used. These terms are just intended to distinguish the components from other components, and the terms do not limit the nature, sequence, or order of the components. When it is disclosed that any component is "connected", "coupled", or "linked" to other components, it should be understood that the component may be directly connected or linked to other components, but another component may be "connected", "coupled", or "linked" between the respective components.

Referring to the drawings, a beekeeping container of the present invention has a structure in which a shelf frame 20 is rotatably coupled to a container body 10, and a plurality of beekeeping barrel shelves 30 are coupled to the shelf frame 20.

The container body 10 includes a bottom panel 12 and a support frame 14. A ceiling panel may be included in the container body 10.

Figure 3:
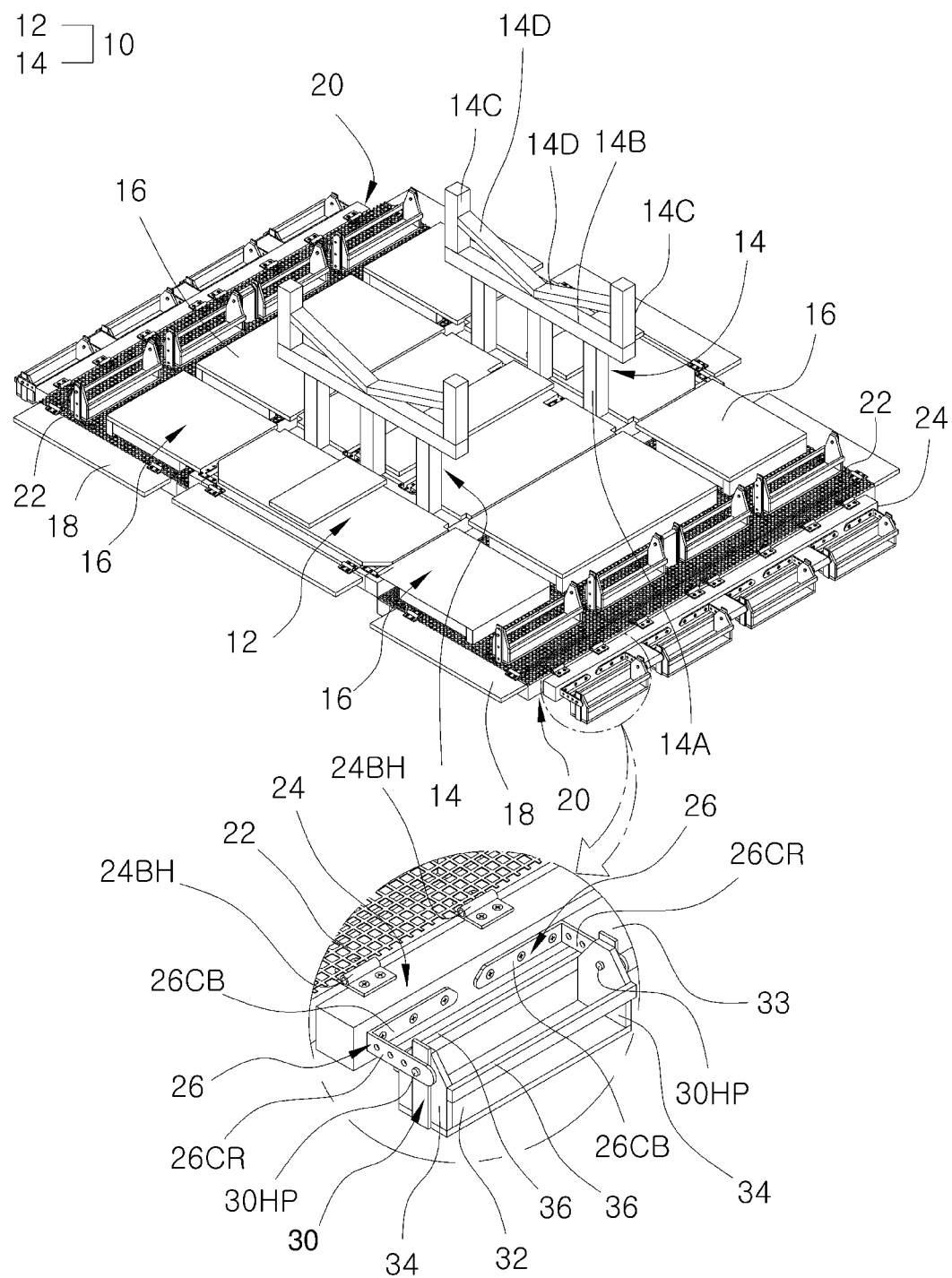
FIG. 3 is a perspective view showing a state in which the shelf frame as the main part shown in FIG. 1 is unfolded.
Figure 4:
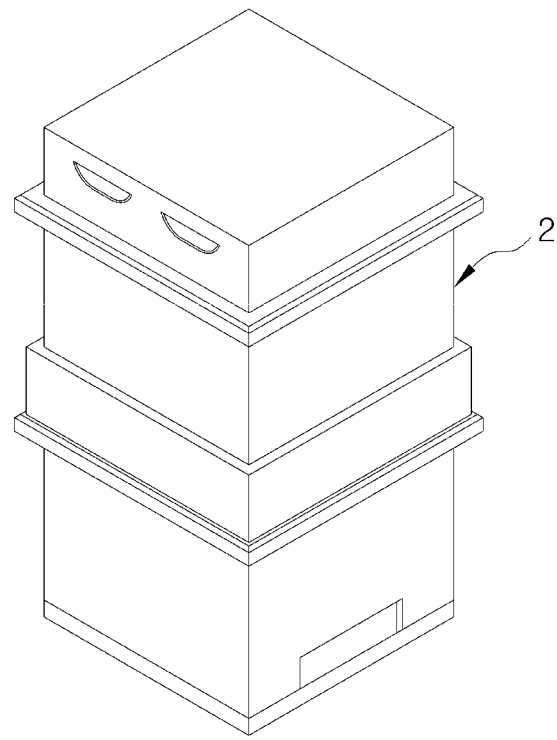
FIG. 4 is a perspective view of a beekeeping barrel mounted on the beekeeping barrel shelf as the main part shown in FIG. 1.
Figure 5:
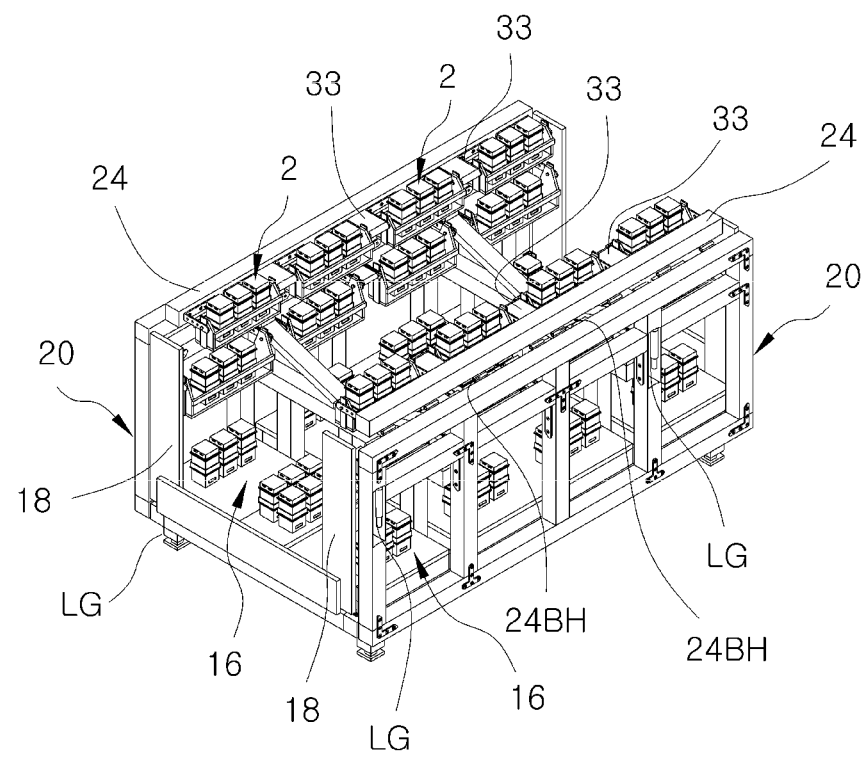
FIG. 5 is a perspective view showing a state in which the beekeeping barrel is mounted on the beekeeping barrel shelf as the main part shown in FIG. 1.

As shown in FIG. 3, the bottom panel 12 is a bottom plate of the container body 10. The bottom panel 12 has a rectangular plate shape. That is, the bottom panel 12 is configured by a bottom frame in which a plurality of longitudinal bars and transverse bars are connected in a rectangular shape and a panel coupled to the bottom frame, and the bottom panel 12 has a rectangular plate shape. In addition, a plurality of legs LG is provided on a lower surface of the bottom panel 12. In this case, the legs LG may be configured to adjust a height. The legs LG may include an upper leg LG, a lower leg LG, and a height adjusting means. The upper end of the upper leg LG is fixed to the lower surface of the bottom panel 12, the lower leg LG is slidably coupled to the upper leg LG, a cylinder is interposed between the upper leg LG and the lower leg LG, a base end of the cylinder is connected to the upper leg LG, and a cylinder rod of the cylinder is connected to the lower leg LG. As a result, as the cylinder rod of the cylinder is extended, the lower leg LG is extended from the upper leg LG, and thus the length of the leg LG is adjusted. At this time, the cylinder itself is connected to the lower surface of the bottom panel 12 to become the leg LG. The cylinder rod of the cylinder is extended so that the length of the leg LG on the lower surface of the bottom panel 12 is adjusted. Preferably, a support plate is provided on the cylinder rod so that the cylinder rod of the cylinder may be extended while the support plate contacts a ground. As such, the legs LG can be adopted as long as the length may be adjusted.

As shown in FIG. 3, the support frame 14 is coupled to the bottom panel 12. The support frame 14 includes a lower support bar 14A, a horizontal support bar 14B, and an upper support bar 14C. The support frame 14 may further include a reinforced connection bar 14D. The support frames 14 are disposed at predetermined intervals in a front end and a rear end (longitudinal direction) of the bottom panel 12.

The lower end of the lower support bar 14A is fixed to the upper surface of the bottom panel 12. The lower end of the lower support bar 14A may be fixed to the bottom panel 12 by a fixing means such as a bracket and a bolt. The lower support bar 14A has a structure which is erected perpendicularly to the bottom panel 12. Further, a plurality of lower support bars 14A are arranged in parallel in a direction (width direction) of both sides of the bottom panel 12.

The horizontal support bar 14B is fixed to the upper end of the lower support bar 14A. The horizontal support bar 14B is disposed in a direction of the left and right ends of the bottom panel 12. The horizontal support bar 14B is horizontally disposed in the width direction of the bottom panel 12. The horizontal support bar 14B may be fixed to the upper end of the lower support bar 14A by a fixing means such as a bracket and a bolt.

The upper support bar 14C is coupled to the horizontal support bar 14B. The lower end of the upper support bar 14C is fixed to the horizontal support bar 14B. The lower end of the upper support bar 14C may be fixed to the horizontal support bar 14B by a fixing means such as a bracket and a bolt. The upper support bar 14C has a structure which is erected in a vertical direction to the horizontal support bar 14B. Further, a plurality of upper support bars 14C are arranged in parallel in a direction (width direction) of both ends of the horizontal support bar 14B. In the present invention, two upper support bars 14C are arranged in a direction (width direction) of both ends of the horizontal support bar 14B. The upper support bar 14C supports a rotation bar 24 to be described below from below. The rotation bar 24 is rotatably coupled to the upper end of the shelf frame 20 by a hinge portion 30HP so that the shelf frame 20 is rotated inward of the shelf frame 20 while standing on the frame hinge portion 20FH at the lower end. The rotation bar 24 folded inward is mounted on a support block provided inside the shelf frame 20 and the support block is mounted on the upper end of the upper support bar 14C so that the upper support bar 14C may adopt a structure in which the rotation bar 24 is supported from below.

As shown in FIG. 3, the reinforced connection bar 14D is connected to the horizontal support bar 14B and the upper support bar 14C. Both ends of the reinforced connection bar 14D are connected to the horizontal support bar 14B and the upper support bar 14C. A pair of reinforced connection bars 14D are disposed at left and right sides based on a central line between both ends of the horizontal support bar 14B. When viewed from one surface of the horizontal support bar 14B, the pair of reinforced connection bars 14D are connected between a pair of upper support bars 14C and the horizontal support bar 14B, respectively. At this time, the reinforced connection bar 14D is slantly connected between the upper support bar 14C and the horizontal support bar 14B. While the reinforced connection bar 14D is upwardly inclined with respect to the horizontal support bar 14B, both ends of the reinforced connection bar 14D are connected to the horizontal support bar 14B and the upper support bar 14C, respectively. When viewed from one surface of the horizontal support bar 14B, the pair of reinforced connection bars 14D are slantly connected between the horizontal support bar 14B and a pair of upper support bars 14C, respectively. The reinforced connection bar 14D is supported by connecting the horizontal support bar 14B and the upper support bar 14C like a trust structure to more firm the support structure of the horizontal support bar 14B and the upper support bar 14C.

A plurality of support frames 14 having the above configuration are arranged in front and rear ends (longitudinal direction) of the bottom panel 12. The plurality of support frames 14 are arranged at predetermined intervals in the longitudinal direction of the bottom panel 12. The plurality of support frames 14 erected like a telephone pole are arranged at predetermined intervals in the longitudinal direction of the bottom panel 12.

Figure 8:
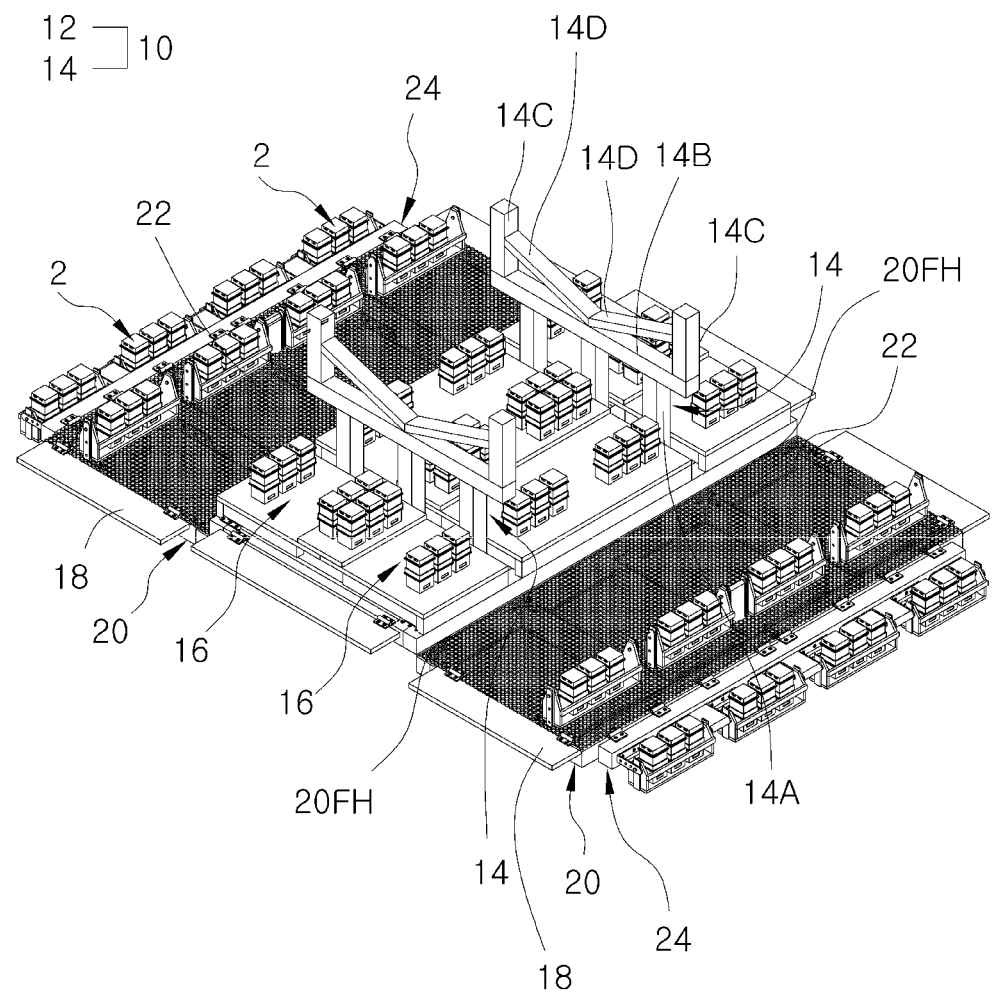
FIG. 8 is a perspective view showing a state in which the shelf frame shown in FIG. 6 is unfolded.
Figure 9:
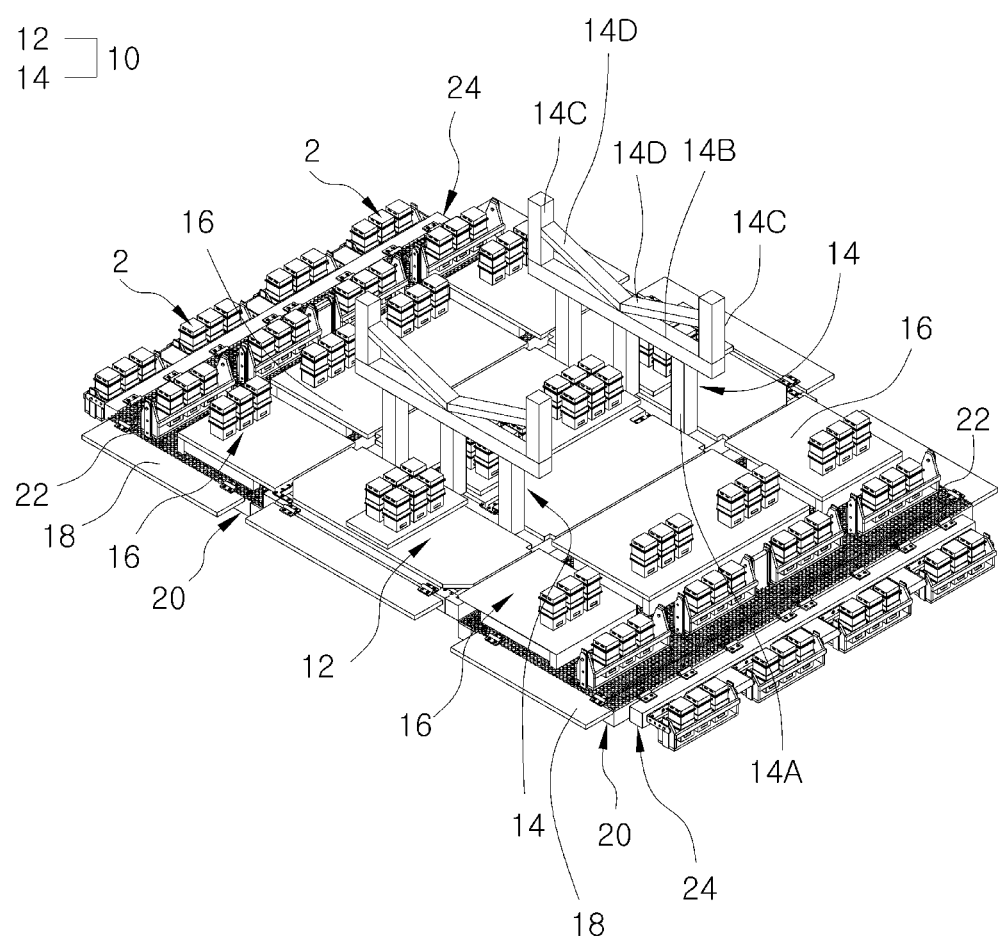
FIG. 9 is a perspective view showing a state in which a slide shelf shown in FIG. 8 is drawn out.
Figure 10:
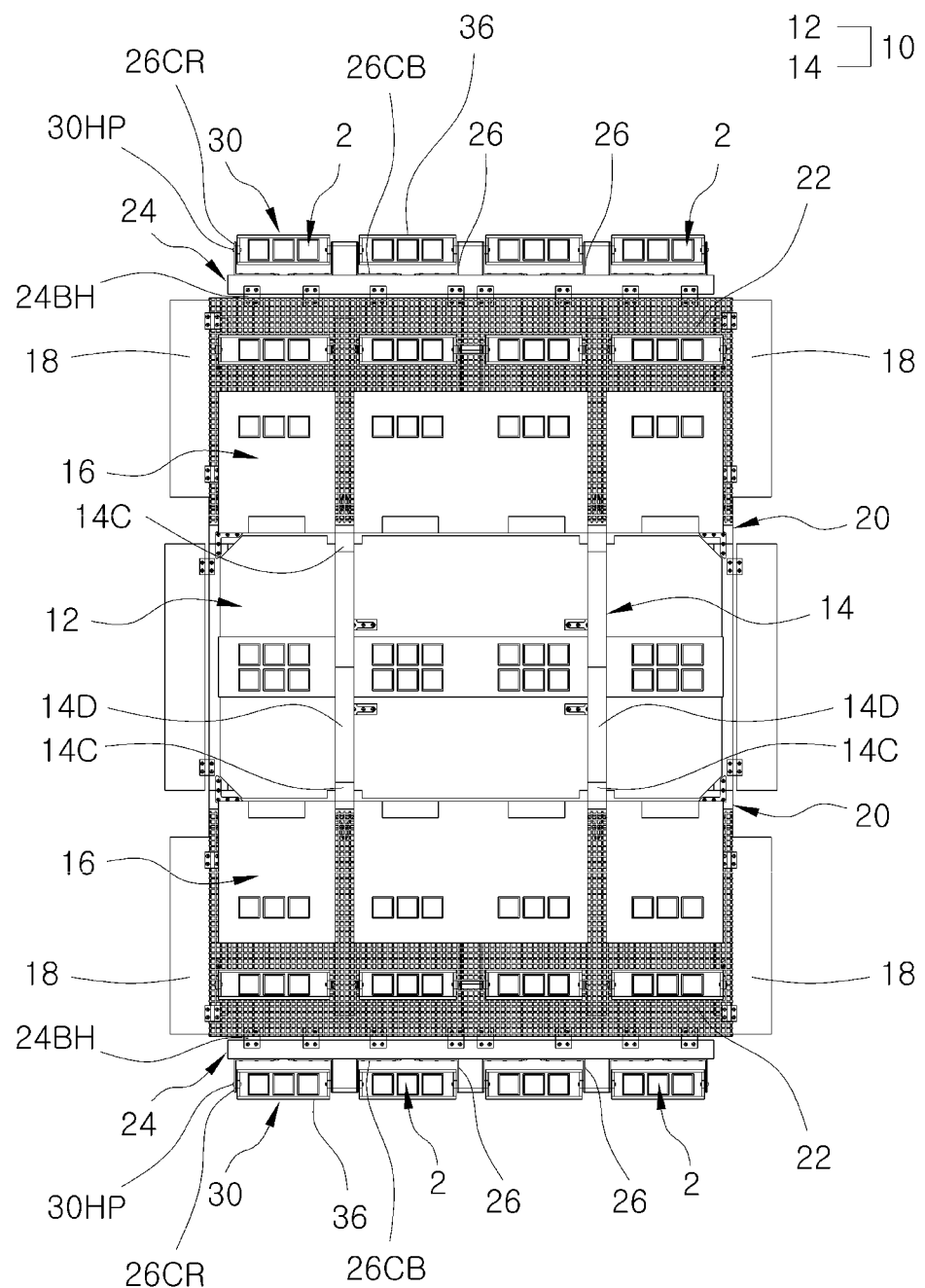
FIG. 10 is a plan view of FIG. 9.
Figure 11:
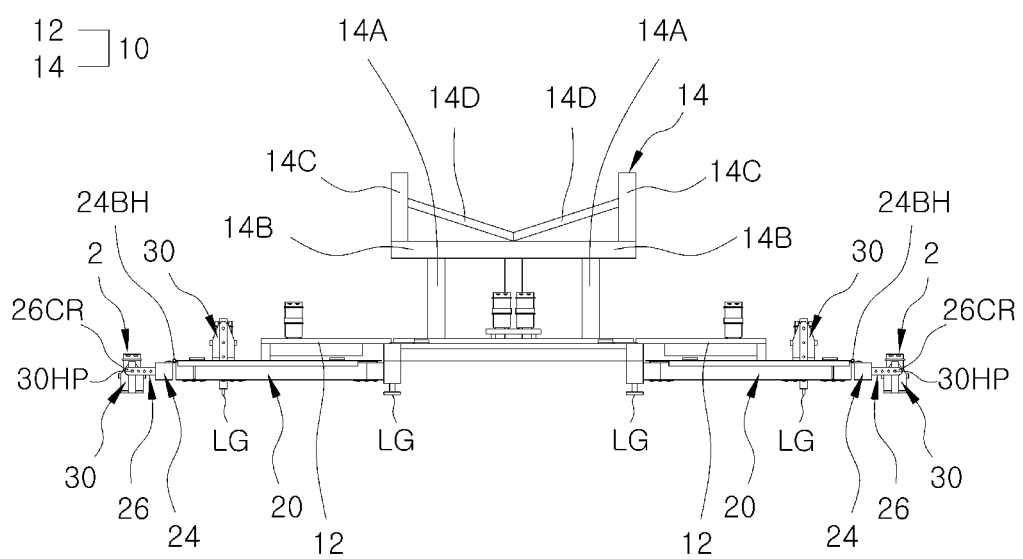
FIG. 11 is a front view of FIG. 9.
Figure 12:
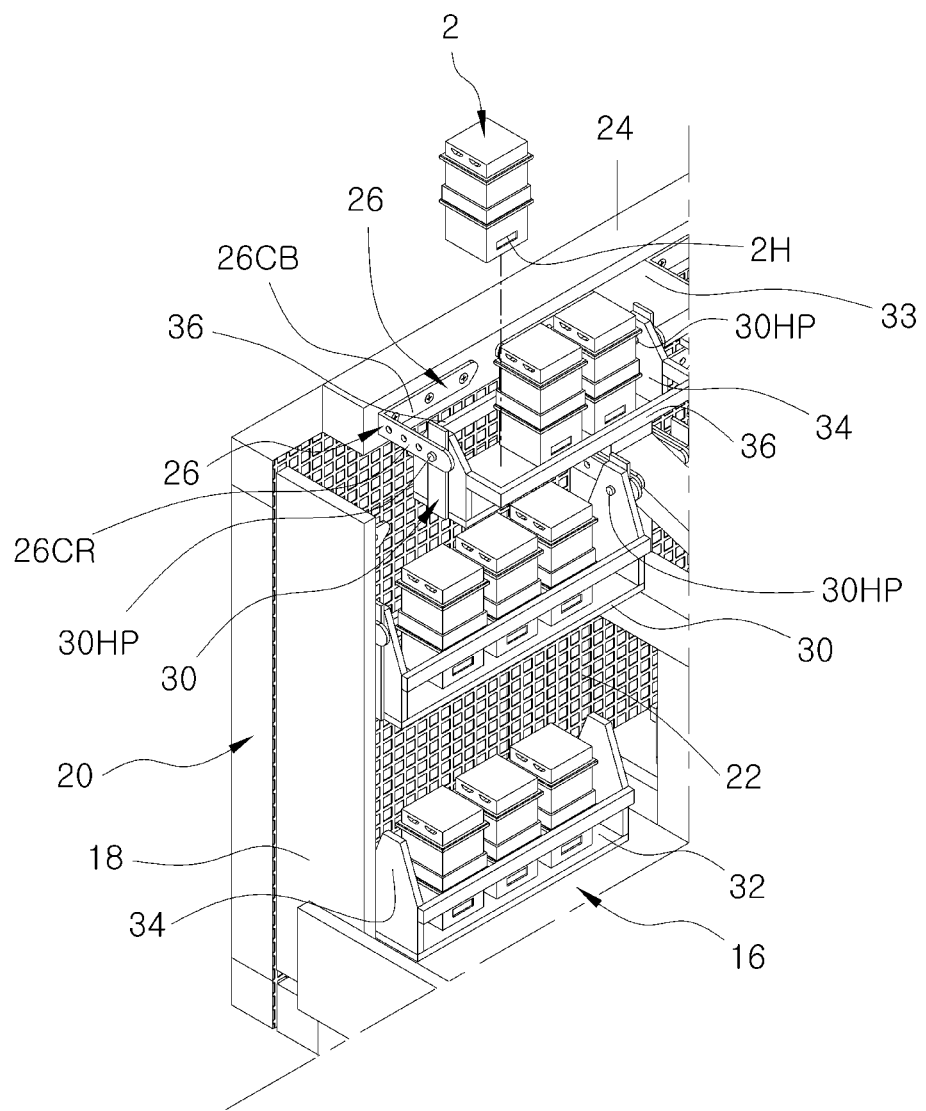
FIG. 12 is an enlarged perspective view showing a state in which the beekeeping barrel is mounted on the beekeeping barrel shelf as the main part shown in FIG. 6 and a diagram showing a state in which one of a plurality of beekeeping barrels is lifted on the beekeeping barrel shelf.
Figure 13:
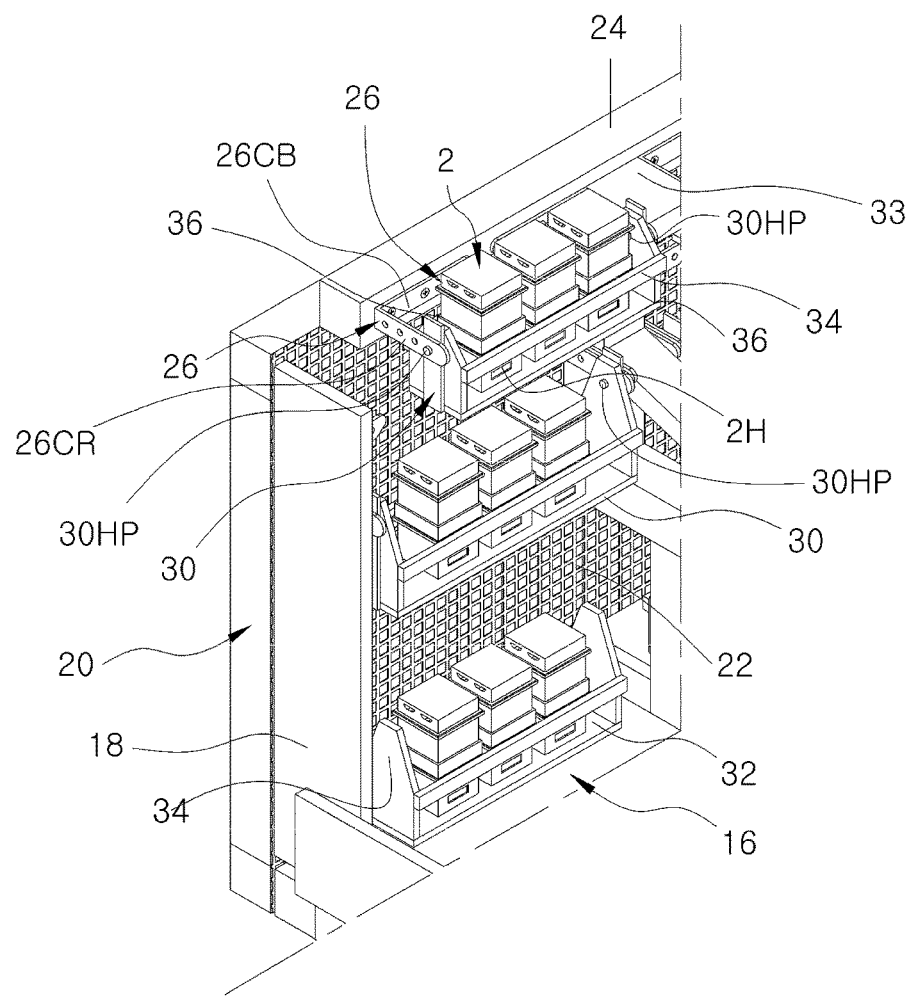
FIG. 13 is an enlarged perspective view showing a state in which the beekeeping barrel is mounted on the beekeeping barrel shelf as the main part shown in FIG. 6.

As shown in FIG. 8, the shelf frame 20 is coupled to the container body 10 via the frame hinge portion 20FH. The shelf frame 20 is rotated in the container body 10 based on the frame hinge portion 20FH.

The shelf frame 20 has a rectangular frame shape in which a plurality of horizontal bars and vertical bars are connected to each other. The frame panel 22 may be provided on the shelf frame 20. The frame panel 22 may be detachably coupled to the shelf frame 20 by a fixing means such as a bolt. The lower end of the shelf frame 20 is connected to the container body 10 by the frame hinge portion 20FH. The lower end of the shelf frame 20 is connected to the side end of the bottom panel 12 as the configuration of the container body 10 via the frame hinge portion 20FH. A pair of shelf frames 20 are connected to both side ends of the bottom panel 12 via the frame hinge portion 20FH. The pair of shelf frames 20 has a structure which is connected to left and right side ends of the bottom panel 12 via the frame hinge portion 20FH based on a longitudinally central line of the bottom panel 12. A pair of left and right shelf frames 20 are vertically erected and horizontally unfolded on the bottom panel 12 based on the frame hinge part 20FH.

Figure 6:
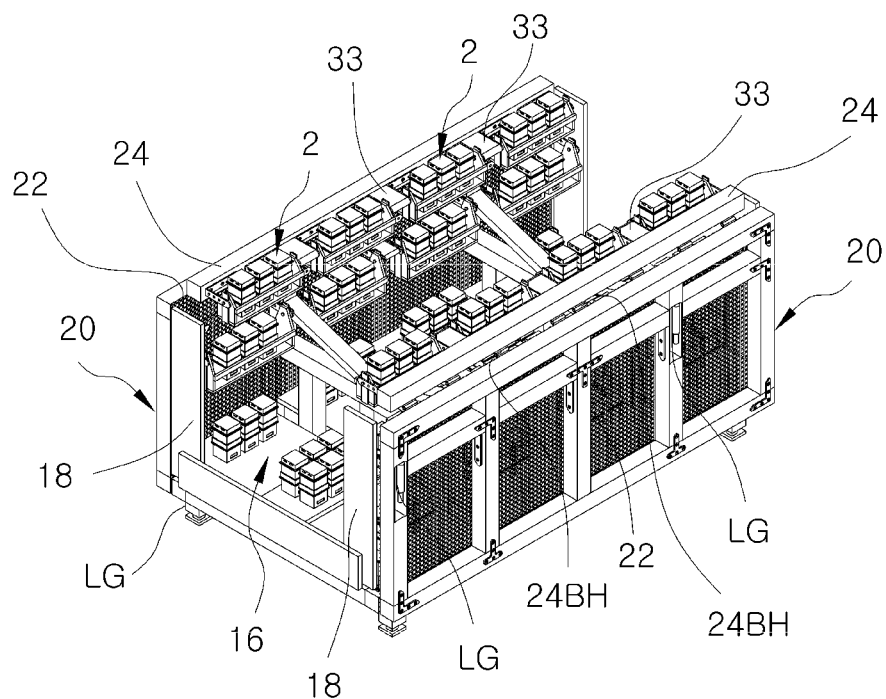
FIG. 6 is a perspective view showing a state in which the beekeeping barrel is mounted on the beekeeping container according to the present invention.
Figure 7:
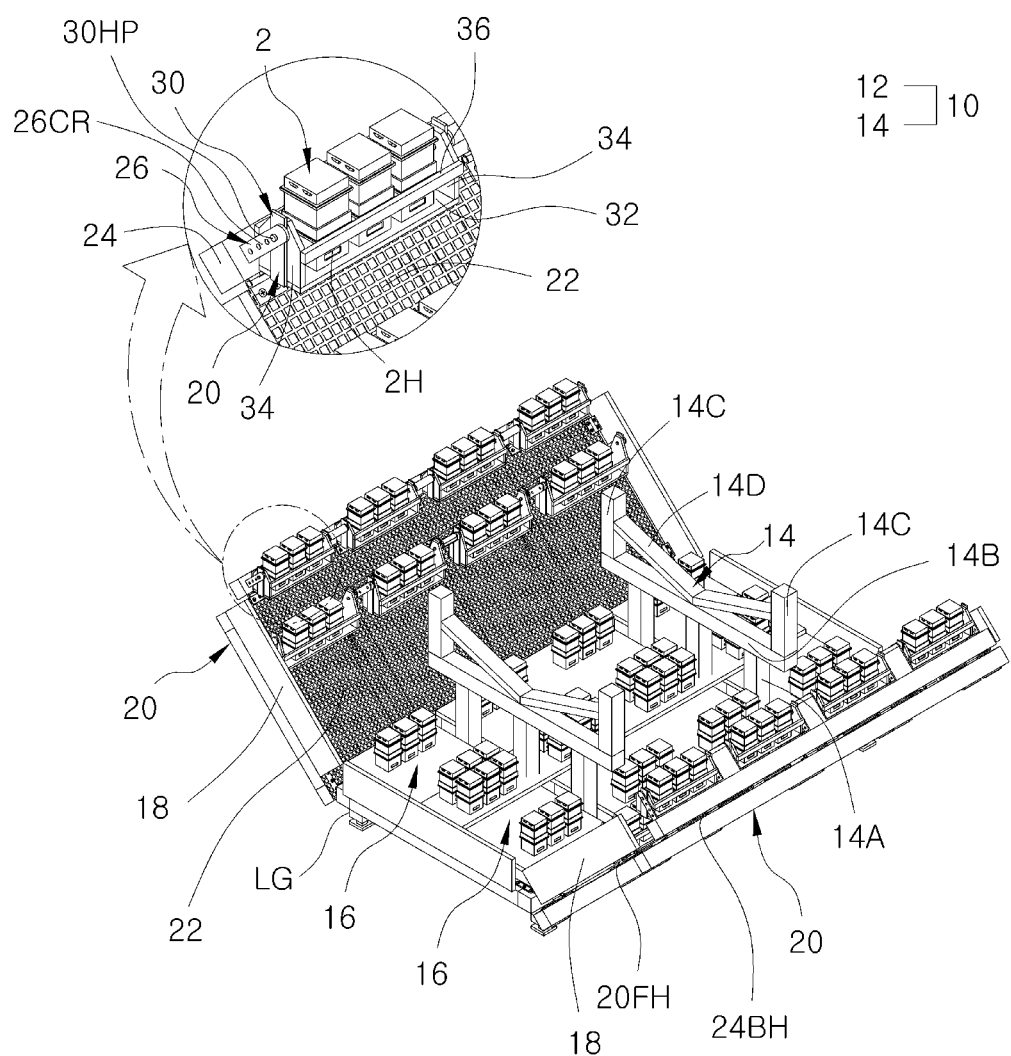
FIG. 7 is a perspective view showing a process in which the shelf frame shown in FIG. 6 is unfolded.

Referring to FIG. 6, the rotation bar 24 is coupled to an upper end of the shelf frame 20 through a bar hinge portion 24BH. The rotation bar 24 has a bar shape elongated in a direction (longitudinal direction) of front and rear ends of the shelf frame 20.

Figure 2:
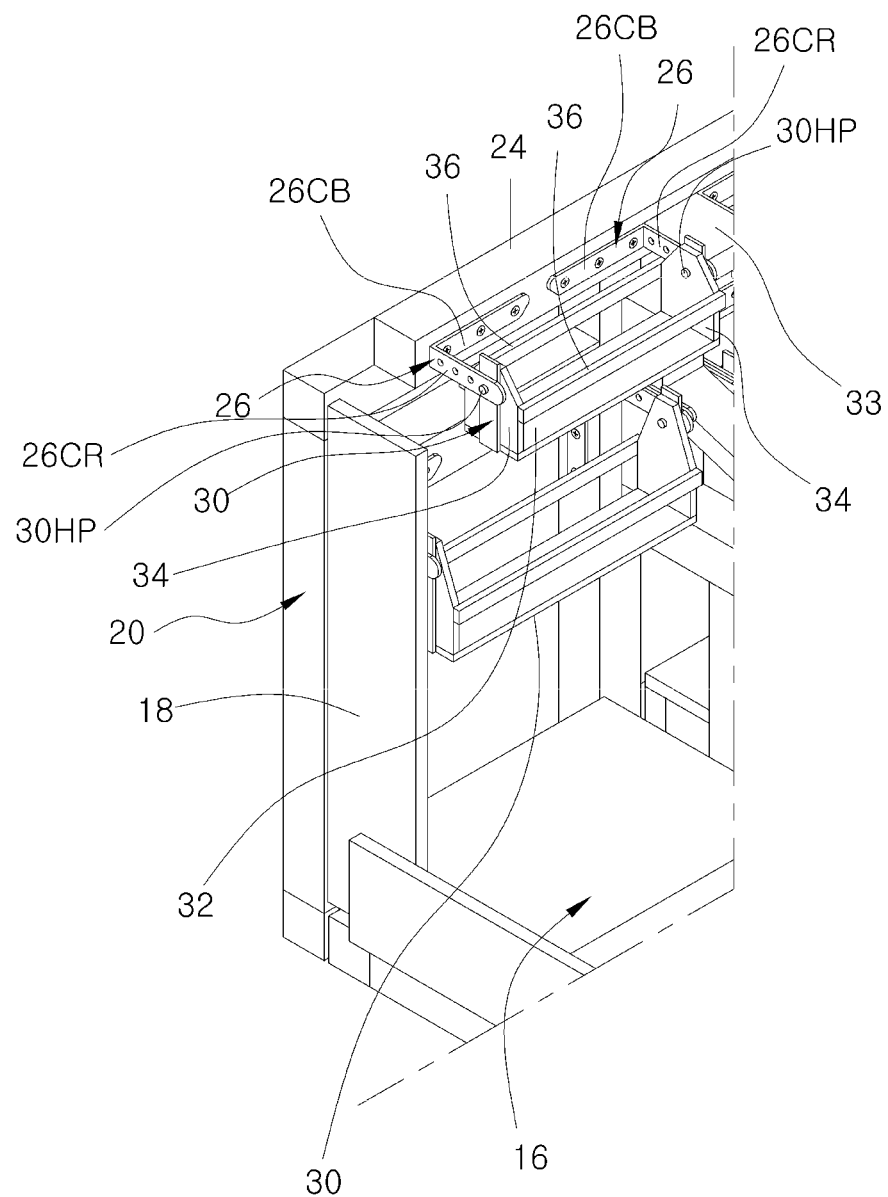
FIG. 2 is a partially enlarged perspective view showing a beekeeping barrel shelf and a shelf frame part which are main parts shown in FIG. 1.

Referring to FIG. 2, the shelf frame 20 is provided with a shelf bracket 26. The shelf bracket 26 is provided with a cross bracket piece 26CR in a direction perpendicular to one end of a connection bracket piece 26CB. The shelf bracket 26 is constituted in a secretarial shape by the connection bracket piece 26CB and the cross bracket piece 26CR.

Referring to FIG. 2, the connection bracket piece 26CB of the shelf bracket 26 is disposed in the longitudinal direction of the shelf frame 20 and fixed to the shelf frame 20 by a fixing means such as a bolt. When the connection bracket piece 26CB of the shelf bracket 26 is fixed to the shelf frame 20, the cross bracket piece 26CR protrudes from the inner surface of the shelf frame 20 in a perpendicular direction. The respective cross bracket pieces 26CR of the pair of shelf bracket pieces 26 disposed in the longitudinal direction of the shelf frame 20 are disposed at a place which faces each other to couple the beekeeping barrel shelf 30 to the respective cross bracket pieces 26CR of the pair of shelf bracket pieces 26 via a hinge portion 30HP.

As shown in FIGS. 3 and 6, the shelf bracket 26 is fixed to the rotation bar 24 which is rotatably coupled to the upper end of the shelf frame 20 via the bar hinge portion 24BH. The rotation bar 24 is elongated in the longitudinal direction of the shelf frame 20 and the connection bracket piece 26CB of the shelf bracket 26 in the longitudinal direction of the rotation bar 24 is fixed to the rotation bar 24 by a fixing means such as a bolt. When the connection bracket piece 26CB of the shelf bracket 26 is fixed to the rotation bar 24, the cross bracket pieces 26CR protrudes from the inner surface of the rotation bar 24 in the perpendicular direction, and when the inner surface of the rotation bar 24 is rotated based on the bar hinge portion 24BH to be disposed in a parallel direction with the inner surface of the shelf frame 20, the cross bracket pieces 26CR of the shelf bracket 26 fixed to the rotation bar 24 protrudes from the inner surface of the shelf frame 20 in the perpendicular direction. The respective cross bracket pieces 26CR of the pair of shelf bracket pieces 26 disposed in the longitudinal direction of the shelf frame 24 are disposed at a place which faces each other to couple the beekeeping barrel shelf 30 to the respective cross bracket pieces 26CR of the pair of shelf bracket pieces 26 via the hinge portion 30HP. Since the rotation bar 24 is a configuration of the shelf frame 20, the shelf bracket 26 fixed to the rotation bar 24 may be mounted on the shelf frame 20.

The pair of shelf brackets 26 makes a pair to be referred to as a set of shelf brackets 26, and the cross bracket pieces 26CR constituting respective shelf brackets 26 of the set of shelf brackets 26 are arranged in parallel with each other in the longitudinal direction of the shelf frame 20. A plurality of sets of shelf brackets 26 are provided in the longitudinal direction of the shelf frame 20. When viewed from the inner surface of the shelf frame 20, a plurality of sets of shelf brackets 26 such as a first column set of shelf brackets 26 and a second column set of shelf brackets 26 are provided in the longitudinal direction of the shelf frame 20. The sets of shelf brackets 26 are provided with a plurality of layers in a direction of upper and lower ends of the shelf frame 20.

While the shelf frame 20 is erected based on the frame hinge portion 20FH of the lower end, a lower set of shelf brackets 26 may be referred to as a first end set of shelf brackets 26 and an upper set of shelf brackets 26 may be referred to as a second end set of shelf brackets 26. As such, the sets of shelf brackets 26 are provided with a plurality of layers in a direction of upper and lower ends of the shelf frame 20. That is, a plurality of sets of shelf brackets 26 may be provided in longitudinal and vertical directions of the shelf frame 20. In other words, the sets of shelf brackets 26 are arranged in the shelf frame 20 in a plurality of rows and columns. At this time, the beekeeping barrel shelves 30 are connected to each other by a connection member 33, so that all the beekeeping barrels 30 of each layer provided in the shelf frame 20 may be rotated simultaneously with respect to the hinge portion 30HP. Since all the beekeeping barrel shelves 30 in each layer are rotated together, it is possible to prevent the beekeeping shelves 30 from flowing individually with respect to the hinge portion 30HP.

Figure 14:
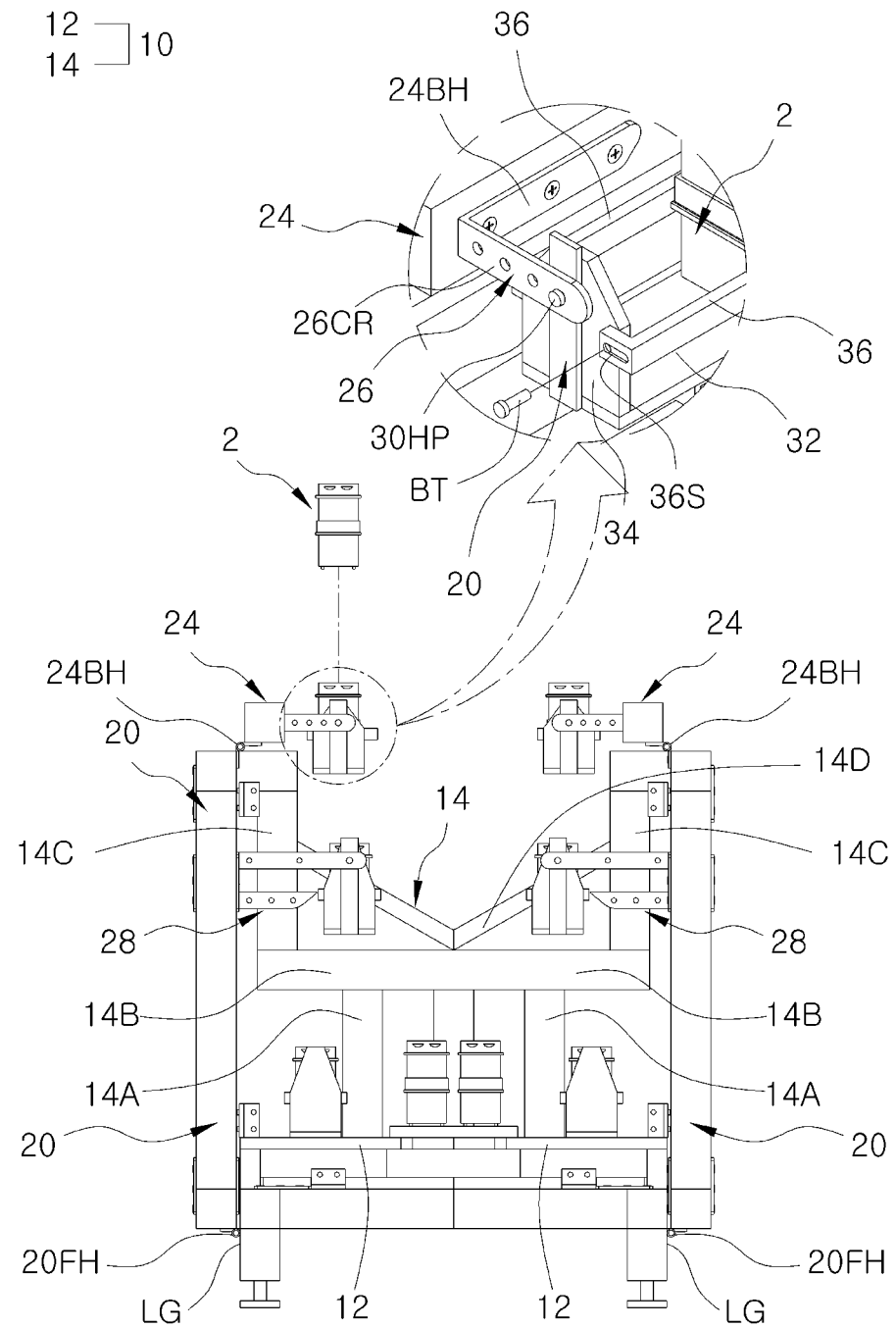
FIGS. 14 and 15 are enlarged diagrams showing a modified embodiment of the beekeeping barrel shelf as the main part as front views of the beekeeping container according to the present invention.
Figure 15:
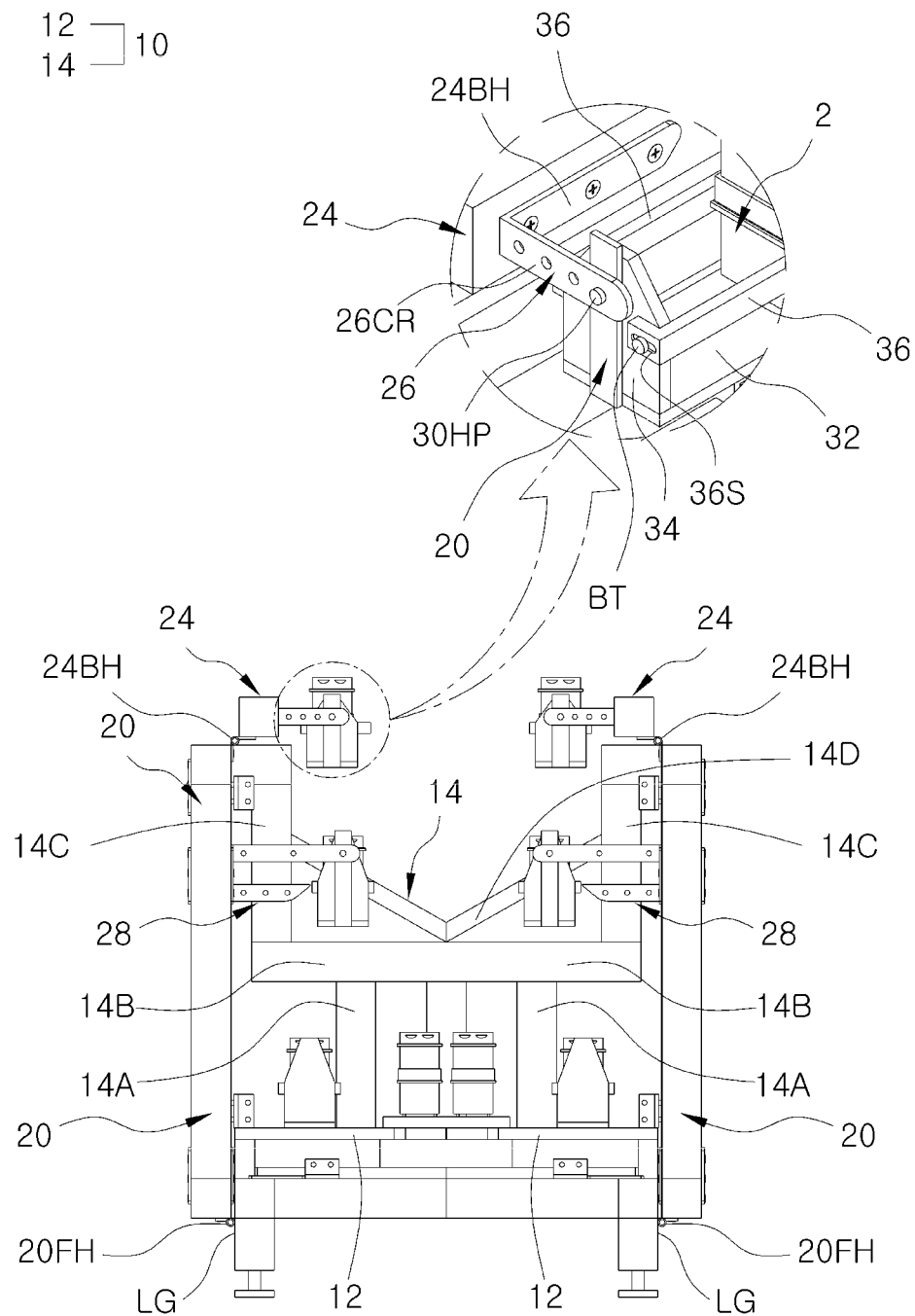

Further, referring to FIGS. 14 and 15, a fixing bracket 28 is provided in the shelf frame 20. The fixing bracket 28 may be fixed to the horizontal bar as the configuration of the shelf frame 20 by a fastener such as a bolt and a part of the fixing bracket 28 protrudes from the inner surface of the shelf frame 20.

A pair of fixing brackets 28 may be fixed to both sides of the horizontal bar so that the pair of fixing brackets 28 may be arranged in parallel in a state of being spaced apart from each other at regular intervals. When viewed from the inner surface of the shelf frame 20, the pair of fixing brackets 28 are provided at both left and right sides. The pair of fixing brackets 28 may be referred to as a set of fixing brackets 28, and a plurality of sets of fixing brackets 28 may be provided in a direction (that is, a longitudinal direction) of front and rear ends of the shelf frame 20. The respective fixing brackets 28 of the set of fixing brackets 28 are disposed at a position which faces both surfaces of the support frame 14 of the container body 10 while erecting the shelf frame 20, respectively. A space secured between the pair of fixing brackets 28 of the set of fixing brackets 28 is inserted to the support frame 14. A space secured between the pair of fixing brackets 28 is inserted to the lower support bar 14A as the configuration of the support frame 14. A space secured between the pair of fixing brackets 28 may be inserted to the upper support bar 14C as the configuration of the support frame 14. Accordingly, when the shelf frame 20 is erected, the pair of fixing brackets 28 are disposed so as to face both sides of the lower support bar 14A (or the upper support bar 14C) of the support frame 14. In other words, in a state where the shelf frame 20 is erected, the pair of fixing brackets 28 of the set of fixing brackets 28 are inserted to the lower support bar 14A (or the upper support bar 14C) of the support frame 14.

As shown in FIG. 1, a plurality of auxiliary legs LG are provided on an outer surface of the shelf frame 20. In this case, the legs LG may be configured to adjust a height. The legs LG may include an upper leg LG, a lower leg LG, and a height adjusting means. The upper end of the upper leg LG is connected to the outer surface of the shelf frame 20 by a leg LG hinge, the lower leg LG is slidably coupled to the upper leg LG, a cylinder is interposed between the upper leg LG and the lower leg LG, a base end of the cylinder is connected to the upper leg LG, and a cylinder rod of the cylinder is connected to the lower leg LG. As a result, as the cylinder rod of the cylinder is extended, the lower leg LG is extended from the upper leg LG, and thus the length of the auxiliary leg LG may be adjusted. At this time, the cylinder itself is connected to the outer surface of the shelf frame 20 to become the auxiliary leg LG. The cylinder rod of the cylinder is extended so that the length of the auxiliary leg LG on the outer surface of the shelf frame 20 may be adjusted. Preferably, a support plate is provided on the cylinder rod so that the cylinder rod of the cylinder may be stretched while the support plate contacts a ground. As such, the auxiliary legs LG can be adopted as long as the length may be adjusted. At this time, the auxiliary leg LG is received in a leg groove formed in the shelf frame 20, and the auxiliary leg LG is prevented from protruding to the outside into the leg groove when the shelf frame 20 is erected. It is possible to prevent the auxiliary leg LG from being caught to be distributed in the handling of the present invention, as in the case of moving.

Referring to FIG. 2, the beekeeping barrel shelf 30 includes a barrel support plate 32, a pair of side support pieces 34 provided at a front end and a rear end of the barrel support plate 32, respectively, and front and rear mounting support bars 36 coupled to both side ends of the pair of side support plates 34. A mounting space portion capable of mounting the beekeeping barrel 2 is formed inside the beekeeping barrel shelf 30 by the barrel support plate 32, the pair of side support pieces 34 and the front and rear mounting support bars 36.

A plurality of shelf brackets 26 protrude from the inner surface of the shelf frame 20 and the beekeeping barrel shelf 30 is fixed to the shelf bracket 26 protruding from the inner surface of the shelf frame 20 via the hinge portion 30HP. The beekeeping barrel shelf 30 is coupled to the pair of shelf brackets 26 protruding from the inner surface of the shelf frame 20 via the hinge portions 30HP. At this time, the pair of side support pieces 34 of the beekeeping barrel shelf 30 are connected to the respective cross bracket pieces 26CR of the set of the shelf brackets 26 by the hinge portions 30HP. Since the shelf bracket 26 is fixed to the shelf frame 20 and the pair of side support pieces 34 of the beekeeping barrel shelf 30 are coupled to the pair of cross bracket pieces 26CR of the shelf bracket 26 facing each other via the hinge portion 30HP, the beekeeping barrel shelf 30 is coupled to the shelf frame 20 via the hinge portion 30HP.

Accordingly, when the shelf frame 20 is unfolded and erected with respect to the frame hinge portion 20FH by coupling the beekeeping barrel shelf 30 to the shelf frame 20 via the hinge portion 30HP, the beekeeping barrel shelf 30 may be held to be erected with respect to the hinge portion 30HP. Since the connection portion between the beekeeping barrel shelf 30 and the shelf frame 20 is the hinge portion 30HP, when the shelf frame 20 is erected with respect to the frame hinge portion 20FH at the lower end, the beekeeping barrel shelf 30 may be held to be vertically erected, and even when the shelf frame 20 is unfolded in a horizontal direction with respect to the frame hinge portion 20FH at the lower end, the beekeeping barrel shelf 30 may be held to be vertically erected.

Referring to FIGS. 1 and 3, at this time, a plurality of beekeeping barrel shelves 30 are also provided in a longitudinal direction of the shelf frame 20. When viewed from the inner surface of the shelf frame 20, a plurality of beekeeping barrel shelves 30 such as a first column beekeeping barrel shelf 30 and a second column beekeeping barrel shelf 30 are provided in the longitudinal direction of the shelf frame 20. The beekeeping barrel shelves 30 are provided with a plurality of layers in a direction of upper and lower ends of the shelf frame 20. While the shelf frame 20 is erected based on the frame hinge portion 20FH of the lower end, a lower beekeeping barrel shelf 30 may be referred to as a first end beekeeping barrel shelf 30 and an upper beekeeping barrel shelf 30 may be referred to as a second end beekeeping barrel shelf 30. As such, the beekeeping barrel shelves 30 are provided with a plurality of layers in a direction of upper and lower ends of the shelf frame 20. That is, a plurality of beekeeping barrel shelves 30 may be provided in longitudinal and vertical directions of the shelf frame 20. In other words, the beekeeping barrel shelves 30 are arranged in the shelf frame 20 in a plurality of rows and columns. As such, when the beekeeping barrel shelves 30 are provided in four columns on each layer, a first column beekeeping barrel shelf 30 to a fourth column beekeeping barrel shelf 30 are connected to each other by the connection member 33 to move together based on the frame hinge portion 20FH. At this time, a hinge shaft is built in the connection member 33 connecting the adjacent beekeeping barrel shelves 30 by a bearing, and the hinge shaft is connected to the side support pieces 34 of the adjacent beekeeping barrel shelves 30 facing each other, so that the hinge shaft may rotate together with the beekeeping barrel shelves 30 separately from the connection member 33.

The shelf frames 20 are provided on both left and right sides of the container body 10, and while the pair of shelf frames 20 are erected in a direction facing each other with respect to the frame hinge portion 20FH at the lower end, a receiving space is secured below the lower beekeeping barrel shelf 30. That is, the container body 10 is provided with the bottom panel 12, and the receiving space capable of mounting the beekeeping barrel 2 is secured between the upper portion of the bottom panel 12 and the lower beekeeping barrel shelf 30, that is, the first end beekeeping barrel shelf 30, and the first end beekeeping barrel shelf 30 is disposed above the beekeeping barrel 2 received in the receiving space.

Referring to FIGS. 1 and 3, the container body 10 further includes a slide shelf 16 that is drawn out from the receiving portion secured above the bottom panel 12 therein. The slide shelf 16 is coupled to the bottom panel 12 by a guide rail. The lower surface of the slide shelf 16 is coupled to a guide rail arranged in the width direction on the upper surface of the bottom panel 12 so that the slide shelf 16 may slide in the width direction of the bottom panel 12. That is, the slide shelf 16 may be drawn out from the side end of the bottom panel 12 to be received above the bottom panel 12 outside the side end of the bottom panel 12. In other words, the slide shelf 16 may be drawn in or out to the side of the bottom panel 12. The slide shelves 16 are disposed on both left and right sides of the bottom panel 12 with respect to a longitudinal center line between both side ends thereof. A pair of slide shelves 16 may be drawn out from both side ends of the bottom panel 12 to be drawn in above the bottom panel 12 from the outside of the both side ends of the bottom panel 12. Meanwhile, in a state where the slide shelves 16 are received in which the pair of slide shelves 16 are drawn in above the bottom panel 12, a receiving space capable of placing the beekeeping barrel 2 is secured even between the front ends of the pair of slide shelves 16. Such a receiving space may be referred to as a core receiving space. For convenience, the receiving space secured between the front ends of the pair of slide shelves 16 while the pair of slide shelves 16 are received is also referred to as a core receiving space.

The present invention further includes a fixing unit for maintaining a state where the shelf frame 20 is erected. The fixing unit includes a fixing member fixed through the fixing bracket 28 and the lower support bar 14A of the support frame 14.

Referring to FIG. 14, the fixing bracket 28 is provided with a bracket fixing hole communicating with both sides of the fixing bracket 28 protruding from the inner surface of the shelf frame 20, and a bar fixing hole communicating with both sides is formed in the lower support bar 14A or the upper support bar 14C.

The fixing member may include a fixing bolt fixed through the fixing bracket 28 and the lower support bar 14A of the support frame 14 and a fixing nut fastened to the fixing bolt. While the shelf frame 20 is erected so that each fixing bracket 28 side of the pair of fixing brackets 28 faces both surfaces of the upper support bar 14C (or the lower support bar 14A) of the support frame 14, the fixing bolt may be coupled to the bracket fixing hole formed in each fixing bracket 28 side of the pair of fixing brackets 28 through the bar fixing hole formed in the upper support bar 14C (or the lower support bar 14A) of the support frame 14, and the fixing nut may be fastened to the fixing bolt.

At this time, the fixing member may be constituted by a fixing pin. While the shelf frame 20 is erected so that each fixing bracket 28 side of the pair of fixing brackets 28 faces both surfaces of the upper support bar 14C (or the lower support bar 14A) of the support frame 14, the fixing pin may be coupled to the bracket fixing hole formed in each fixing bracket 28 side of the pair of fixing brackets 28 through the bar fixing hole formed in the upper support bar 14C (or the lower support bar 14A) of the support frame 14.

The present invention further includes a wire for erecting the shelf frame 20. While one end of the wire is connected to the shelf frame 20, the wire may pass through a wire through hole formed in the horizontal support bar 14B of the support frame 14.

At this time, the present invention may include a wire assembly. The wire assembly may include an upper wire roller, a lower wire roller, and a wire.

The support frame 14 is mounted on a roller bracket, and the upper and lower wire rollers are coupled to the roller bracket.

The wire may be configured to pass through the upper wire roller and the lower wire roller while one end thereof is connected to the shelf frame 20. It is also possible to adopt a structure in which the wire passes through the wire through hole formed in the horizontal support bar 14B of the support frame 14.

According to the present invention having the above configuration, the beekeeping barrel 2 is put into each beekeeping barrel shelf 30 while the shelf frame 20 is unfolded and moves to a place requiring beekeeping while the beekeeping barrel shelf 30 and the beekeeping barrel 2 are erected in a vertical direction by erecting the shelf frame 20, and then the beekeeping may be performed using the beekeeping barrel 2 by unfolding the shelf frame 20 at the beekeeping place again.

In the state in which the shelf frame 20 is unfolded the horizontal direction in the bottom panel 12 of the container body 10, the beekeeping barrel shelf 30 is held in a state of being vertically erected by its own weight with respect to the hinge portion 30HP. The beekeeping barrel shelf 30 is connected to the shelf bracket 26 coupled to the shelf frame 20 via the hinge portion 30HP so that the beekeeping barrel shelf 30 is held in a state of being vertically erected by its own weight with respect to the hinge portion 30HP while the shelf frame 20 is unfolded in the horizontal direction. Meanwhile, the rotation bar 24 is connected to the upper end of the shelf frame 20 via the bar hinge portion 24BH so that the inner surface of the rotation bar 24 is horizontally rotated in parallel with the inner surface of the shelf frame 20 based on the bar hinge portion 24BH while the shelf frame 20 is horizontally direction unfolded. In addition, the beekeeping barrel shelf 30 on the upper layer is coupled to the shelf bracket 26 coupled to the inner surface of the rotation bar 24 via the hinge portion 30HP so that the beekeeping barrel shelf 30 on the upper layer is held in a state of being vertically erected by its own weight with respect to the hinge portion 30HP while the shelf frame 20 is horizontally direction unfolded. That is, the first end beekeeping barrel shelf 30 and the second end beekeeping barrel shelf 30 are held in a state of being vertically erected. At this time, the beekeeping barrel shelves 30 are constituted by the first end beekeeping barrel shelf 30 and the second end beekeeping barrel shelf 30, but it is natural that the beekeeping barrel shelves 30 may be mounted on the shelf frame 20 in many stages such as a third end beekeeping barrel shelf 30 and a fourth end beekeeping barrel shelf 30.

Since the beekeeping barrel shelves 30 are provided in multiple stages in the shelf frame 20, a plurality of layers and columns of beekeeping barrel shelves 30 are erected in the vertical direction while the shelf frame 20 is unfolded in the horizontal direction so as to put the beekeeping barrel 2 into each beekeeping barrel shelf 30. The beekeeping barrel 2 is received in the inner receiving portion of the beekeeping barrel shelf 30 so as not to be removed from the beekeeping barrel shelf 30. Since four surfaces and the lower surface of the beekeeping barrel 2 are supported to the pair of side support pieces 34 and the pair of mounting support bars 36 of each beekeeping barrel shelf 30 and the barrel support piece, the beekeeping barrel 2 is stably mounted in the inner receiving portion of the beekeeping barrel shelf 30 without removing. The beekeeping barrel shelf 30 is vertically erected with respect to the hinge portion 30HP so that the beekeeping barrel 2 is held in a state of being vertically erected together with the beekeeping barrel shelf 30.

In summary, the shelf frame 20 is provided with a lower-layer beekeeping barrel shelf 30 and an upper-layer beekeeping barrel shelf 30 and the upper-layer beekeeping barrel shelf 30 is rotatably to the upper end of the shelf frame 20 via the rotation bar 24 so that the rotation bar 24 and the upper-layer shelf frame 20 are unfolded out of the shelf frame 20 when the shelf frame 20 is unfolded.

Further, the beekeeping barrel 2 may also be mounted on the bottom panel 12 of the container body 10. In the present invention, the slide shelf 16 is coupled to the bottom panel 12 so that the slide shelf 16 is pulled out from the bottom panel 12 and then the beekeeping barrel 2 is placed on the slide shelf 16, the beekeeping barrel 2 is placed even in an upper surface area of the bottom panel 12 formed of the core receiving space in the bottom panel 12 and then the slide shelf 16 is pushed above the bottom panel 12. At this time, it is preferable that while the slide shelf 16 is pulled out from the bottom panel 12, the beekeeping barrel 2 is placed even in the upper surface area of the bottom panel 12 formed of the core receiving space in the bottom panel 12, the beekeeping barrel 2 is placed on the slide shelf 16 pulled out from the bottom panel 12, the slide shelf 16 on which the beekeeping barrel 2 is placed is put in the bottom panel 12 again, and then the beekeeping barrel 2 is mounted on each beekeeping barrel shelf 30 provided on the shelf frame 20.

Next, the shelf frame 20 is erected with respect to the frame hinge portion 20FH at the lower end in a state in which the beekeeping barrel 2 is mounted on the beekeeping barrel shelf 30. At this time, since the beekeeping barrel shelf 30 is connected to the shelf bracket 26 protruding from the inner surface of the shelf frame 20 by the hinge portion 30HP, the beekeeping barrel shelf 30 is vertically rotated based on the hinge portion 30HP even when the shelf frame 20 is erected, so that the beekeeping barrel shelf 30 is held in a state of being erected in the vertical direction at all times and the beekeeping barrel 2 mounted on the beekeeping barrel shelf 30 may also be held in a state of being erected in the vertical direction at all times.

In the present invention, the shelf frame 20 may be held in the erected state by the fixing unit. While the shelf frame 20 is erected so that each fixing bracket 28 side of the pair of fixing brackets 28 faces both surfaces of the upper support bar 14C (or the lower support bar 14A) of the support frame 14, the fixing bolt may be coupled to the bracket fixing hole formed in each fixing bracket 28 side of the pair of fixing brackets 28 through the bar fixing hole formed in the upper support bar 14C (or the lower support bar 14A) of the support frame 14 and the fixing nut may be fastened to the fixing bolt, so that the shelf frame 20 may be held in the erected state.

At this time, when the fixing member is constituted by the fixing pin, while the shelf frame 20 is erected so that each fixing bracket 28 side of the pair of fixing brackets 28 faces both surfaces of the upper support bar 14C (or the lower support bar 14A) of the support frame 14, the fixing pin may be coupled to the bracket fixing hole formed in each fixing bracket 28 side of the pair of fixing brackets 28 through the bar fixing hole formed in the upper support bar 14C (or the lower support bar 14A) of the support frame 14, so that the shelf frame 20 may be held in the erected state.

As such, the beekeeping barrel 2 is mounted in the inner receiving space of the container body 10, the beekeeping barrel 2 is mounted on each beekeeping barrel shelf 30 provided in the shelf frame 20, the container body 10 is loaded on a vehicle (for example, a container vehicle) while the pair of shelf frames 20 are erected, and then the vehicle is driven to a desired area for beekeeping, the container body 10 is unloaded from the vehicle at the beekeeping place and the pair of shelf frames are unfolded again, thereby performing the beekeeping using the beekeeping barrel 2.

Further, the present invention further includes a locking unit which prevents the beekeeping barrel shelf 30 mounting the beekeeping barrel 2 from being shaken while the shelf frame 20 is erected and prevents the beekeeping barrel shelf 30 from being shaken even while the shelf frame 20 is unfolded. While the shelf frame 20 is erected, the beekeeping barrel shelf 30 is also held in the erected state based on the hinge portion 30HP, and the locking unit serves to fix the beekeeping barrel shelf 30 to the shelf bracket 26. Even while the shelf frame 20 is unfolded in the horizontal direction, the beekeeping barrel shelf 30 is also held in the erected state based on the hinge portion 30HP, and the locking unit serves to fix the beekeeping barrel shelf 30 to the shelf bracket 26.

To this end, the locking unit includes a locking hole formed in the shelf bracket 26, a shelf locking hole formed in the beekeeping barrel shelf 30 (actually formed in at least one side wall of a pair of side walls of the beekeeping barrel shelf 30), a locking bolt coupled to the locking hole through the shelf locking hole, and a locking nut fastened to the locking bolt.

Accordingly, while the shelf frame 20 is erected and the beekeeping barrel shelf 30 is erected at the same time, the pair of side walls of the beekeeping barrel shelf 30 face the side bracket piece of the shelf bracket 26, and while the locking hole and the shelf locking hole are aligned to meet each other, the locking bolt is coupled through both the locking hole and the shelf locking hole and the locking nut is fastened to the locking bolt. As a result, the beekeeping barrel shelf 30 is fixed to the shelf bracket 26 so that the beekeeping barrel shelf 30 may be stably fixed in place without rotating in a front and back direction with respect to the hinge portion 30HP. In addition, while the beekeeping barrel shelf 30 is erected even while the shelf frame 20 is laid in the horizontal direction, the pair of side walls of the beekeeping barrel shelf 30 face the side bracket piece of the shelf bracket 26, and while the locking hole and the shelf locking hole are aligned to meet each other, the locking bolt is coupled through both the locking hole and the shelf locking hole and the locking nut is fastened to the locking bolt. As a result, the beekeeping barrel shelf 30 is fixed to the shelf bracket 26 even while the shelf frame 20 is unfolded in the horizontal direction, so that the beekeeping barrel shelf 30 may be stably fixed in place without rotating in a front and back direction with respect to the hinge portion 30HP.

At this time, when the locking pin instead of the locking bolt is adopted, while the shelf frame 20 is erected or unfolded so that the locking holes formed in the pair of side bracket pieces of the shelf bracket 26 and the shelf locking holes formed in the pair of side walls of the beekeeping barrel shelf 30 are aligned to meet each other, the locking pin is coupled through the locking hole and the shelf locking hole. As a result, since the beekeeping barrel shelf 30 is stably fixed to the shelf bracket 26 while the shelf frame 20 is erected or unfolded, the beekeeping barrel shelf 30 may be firmly held in place without rotating in a front and back direction with respect to the hinge portion 30HP.

Meanwhile, it is natural that the locking unit may be adopted as long as the locking unit is a means for fixing the beekeeping barrel shelf 30 to the shelf bracket 26 in a state in which the shelf frame 20 is erected and unfolded.

Therefore, since the beekeeping container according to the present invention may load and carry a large number of beekeeping barrels 2 compared with the related art, it is possible to solve the limit of carrying a desired number of beekeeping barrels 2 due to the lack of the loading space. The present invention solves many problems that the carrying of the beekeeping barrels 2 needs to be performed many times like driving the vehicle many times capable of carrying a desired number of beekeeping barrels 2, inconvenience of the operation and waste of installation time of the beekeeping barrels 2 are caused, and a lot of logistics costs is required. That is, the present invention has an effect of solving a disadvantage of spending a lot of time and efforts required for carrying the beekeeping barrels 2. In the present invention, since the beekeeping barrel 2 is carried to the beekeeping site and then the shelf frame 20 is unfolded so that the beekeeping barrel 2 is used as it is while the shelf frame 20 is unfolded without being lifted from the beekeeping barrel shelf 30, it is possible to increase the convenience in beekeeping operation and to reduce the waste of manpower, the waste of time, and the hard work due to the carrying of the beekeeping barrels 2.

A plurality of legs LG capable of adjusting the length thereof is provided in the bottom panel 12 of the container body 10 to adjust the length of the legs LG even when the beekeeping container of the present invention is loaded on the vehicle, thereby more enhancing convenience even when the vehicle is loaded, and after the beekeeping container of the present invention is loaded on the vehicle, the length of the leg LG is reduced again, thereby more conveniently performing the subsequent operation even after the loading on the vehicle.

Meanwhile, when the auxiliary legs LG face the ground of an installation area of the beekeeping barrels 2 while the shelf frame 20 is unfolded, there is a difference in height of the ground of the installation area of the beekeeping barrels 2. As a result, when the lengths are adjusted every the plurality of auxiliary legs LG, the shelf frame 20 may be installed horizontally on the ground at a uniform height, so that it is possible to provide the beekeeping barrel shelf 30 and beekeeping barrel 2 mounted on the shelf frame 20 at a uniform height in the beekeeping area.

After the beekeeping operation is completed using the beekeeping barrel 2 mounted on the beekeeping barrel shelf 30, the container body 10 is loaded on the vehicle body while the shelf frame 20 is erected to move to a honey collection place, so that it is possible to solve the troublesome work of picking up the heavy beekeeping barrels 2 one by one and loading the beekeeping barrels 2 on the vehicle after the beekeeping operation is completed. Even after the beekeeping operation is completed, it is possible to reduce time and hard work required for carrying and loading the beekeeping barrels 2.

A slide shelf 16 drawn out from the receiving space secured above the bottom panel 12 is further provided in the container body 10 and the beekeeping barrel 2 is mounted on the slide shelf 16. Therefore, since the slide shelf 16 is removed from the bottom panel 12 and the beekeeping barrel 2 is placed on the slide shelf 16 to be pushed back, it is possible to more easily and rapidly perform the mounting of the beekeeping barrels 2, further increase the loading number of the beekeeping barrels 2, and more easily expose the beekeeping barrels 2 after the beekeeping operation.

Since the beekeeping barrel 2 may be mounted even on the core receiving space further secured inside the slide shelf 16, it is possible to maximally increase the installation number of beekeeping barrels 2. Maximizing the receiving number of beekeeping barrels 2 means maximally increasing the collection amount of honey by beekeeping as well as maximally increasing the convenience of the carrying operation of the beekeeping barrels 2 and the waste of the operation time required for carrying the beekeeping barrels 2.

Further, while the shelf frame 20 is erected, the pair of fixing brackets 28 are coupled to the support frame 14 of the container body 10, that is, the lower support bar 14A or the upper support bar 14C of the support frame 14 to prevent the shelf frame 20 and the beekeeping barrel shelf 30 from flowing in a longitudinal direction of the bottom panel 12 of the container body 10, so that the structure of erecting and supporting the shelf frame 20, the beekeeping barrel shelf 30, and the beekeeping barrel 2 becomes firmer.

Since the reinforced connection bar 14D is connected between the horizontal support bar 14B and the upper support bar 14C, a stronger withstanding force is applied to the load applied to the support frame 14 and the like. In other words, the reinforced connection bar 14D increases the structural strength of the support frame 14, thereby further increasing the force to withstand an external load. The reinforced connection bar 14D further enhances the structural rigidity of the support frame 14. Particularly, since the reinforced connection bar 14D is slantly connected between the upper support bar 14C and the horizontal support bar 14B to more reliably distribute the load acting on the support frame 14, thereby more surely improving the structural rigidity of the support frame 14.

Meanwhile, in the present invention, a door 18 is connected to the front end or the rear end of the pair of shelf frames 20 through a hinge of the door 18. The inner ends of a pair of left and right doors 18 are connected to the front end or the rear end of the shelf frame 20 through the hinge of the door 18. Accordingly, while the shelf frame 20 is unfolded in the horizontal direction, a pair of doors 18 may be opened in the shelf frame 20, and while the pair of shelf frames 20 are erected, the pair of doors 18 are closed with respect to the hinge of the door 18 to maintain a front end opening or a rear end opening formed between the pair of shelf frames 20 and the upper side of the bottom panel 12 of the container body 10 in a blocked state. In the present invention, it is preferable that the pair of right and left doors 18 are coupled to the front end and the rear end of the pair of shelf frames 20 with respect to the hinge of the door 18.

At this time, the pair of doors 18 may be kept by blocking the front end opening or the rear end opening formed between the pair of shelf frames 20 and the upper side of the bottom panel 12 of the container body 10 by a locking means. The locking means includes a locking piece provided on the pair of right and left doors 18, a locking hole formed to face the locking piece, and a locking member fitted in the locking hole. The locking member may be constituted by a locking bolt and a locking nut coupled to the locking bolt. Accordingly, when the pair of shelf frames 20 are erected, the pair of right and left doors 18 are closed, the door 18 may be kept in the closed state by fitting the locking bolts to the locking holes of the locking pieces provided in the pair of doors 18 and fastening the locking nut to the locking bolt. Any means that can keep the pair of doors 18 in a closed state may be adopted as the locking unit. When the pair of left and right doors 18 are provided on the front and rear ends of the pair of shelf frames 20 through the hinge of the door 18, the pair of shelf frames 20, the front end opening and the rear end opening formed between the pair of shelf frames 20 and the upper side of the bottom panel 12 of the container body may be kept to be blocked.

Meanwhile, while the pair of shelf frames 20 are erected, the receiving space between the upper end of the shelf frame 20 and the upper side of the bottom panel 12 is opened upward, and when the upwardly opened portion of the receiving space is referred to as an upper opening portion, the upper opening portion may be blocked by a sealing panel. The sealing panel may be detachably coupled to the pair of shelf frames 20 or the support frame 14 by a fastener such as a bolt. When the fastener passing through the fastener hole of the sealing panel is fastened to fastener coupling holes formed in the pair of shelf frames 20 in a state where the sealing panel is coupled to the upper end of the pair of shelf frames 20, the sealing panel may block the upper opening portion. Alternatively, when the fastener passing through the fastener hole of the sealing panel is fastened to a fastener coupling hole formed in the upper end of the pair of upper support bars 14C configuring the support frame 14 in a state where the sealing panel is coupled to the upper end of the pair of shelf frames 20, the sealing panel may block the upper opening portion.

At this time, a sealing panel receiving space having an upwardly opened sealing panel opening portion is provided in the sealing panel to receive required articles in the sealing panel receiving space. In addition, the sealing panel opening portion may be configured to be blocked by the sealing panel door 18 rotatably coupled by the hinge. In such a case, since articles and the like required for the beekeeping may be received and carried in the sealing panel receiving space, so that the convenience of the operation and the like is further enhanced.

Meanwhile, in the present invention, a front mounting support bar 36 and a rear mounting support bar 36 are provided in front and rear sides of the beekeeping barrel shelf 30, and at least the front mounting support bar 36 or the rear mounting support bar 36 is forwardly or backwardly coupled to the side support piece 34 of the beekeeping barrel shelf 30 to increase a distance from an insertion portion in which the beekeeping barrel 2 is inserted into the beekeeping barrel shelf 30, so that the beekeeping barrel 2 is not locked to the mounting support bar 36 when the beekeeping barrel 2 is put into the beekeeping barrel shelf 30, thereby more easily mounting the beekeeping barrel 2 on the beekeeping barrel shelf 30. Since one of the front mounting support bar 36 and the rear mounting support bar 36 may be opened when the beekeeping barrel 2 is drawn out from the beekeeping barrel shelf 30, there is also a more convenient effect when drawing out the beekeeping barrel 2.

At this time, guide pieces are provided at both ends of the mounting support bar 36 in a perpendicular direction, and the guide pieces may be coupled with both left and right side support pieces 34 of the beekeeping barrel shelf 30 by a movement guide means such as a guide rail. Further, the mounting support bar 36 may be coupled to the beekeeping barrel shelf 30 by a fixing means. Elongated holes extended in a front and rear direction are provided at left and right guide pieces of the mounting support bar 36, and fastening bolts coupled to the elongated holes are fastened to the left and right side support pieces 34 of the beekeeping barrel shelf 30. When the fixing bolt is fastened to the side support piece 34 in a state in which the mounting support bar 36 is opened at the front or rear side of the beekeeping barrel shelf 30, a head portion of the fixing bolt may press and fix the guide piece of the mounting support bar 36 to the side support piece 34 of the beekeeping barrel shelf 30. When the fixing bolt is fastened to the side support piece 34 in a state in which the mounting support bar 36 is narrowed at the front or rear side of the beekeeping barrel shelf 30 (the mounting support bar 36 is narrowed to an original position), the head portion of the fixing bolt may press and fix the guide piece of the mounting support bar 36 to the side support piece 34 of the beekeeping barrel shelf 30. The elongated hole and the fixing bolt of the guide piece may be the fixing means. The means for keeping the mounting support bar 36 in the opened and narrowed states may all be adopted as the fastening means.

In addition, in the present invention, supporters of the beekeeping barrel 2 are installed even on the slide shelf 16 and the support plate of the bottom panel 12 of the container body 10, so that the beekeeping barrel 2 may be stably fixed without shaking by receiving the beekeeping barrel 2 in the supporter of the beekeeping barrel 2. At this time, at least the front mounting support bar 36 or the rear mounting support bar 36 is provided at a periphery of the supporter of the beekeeping barrel 2, and the front mounting support bar 36 or the rear mounting support bar 36 of the mounting support bar 36 is also forwardly or backwardly coupled to the side frame portion of the supporter of the beekeeping barrel 2 to increase a distance from an insertion portion in which the beekeeping barrel 2 is inserted into the supporter of the beekeeping barrel 2, so that the beekeeping barrel 2 is not locked to the mounting support bar 36 when the beekeeping barrel 2 is put into the supporter of the beekeeping barrel 2, thereby more easily mounting the beekeeping barrel 2 on the supporter of the beekeeping barrel 2. Since one of the front mounting support bar 36 and the rear mounting support bar 36 may be opened when the beekeeping barrel 2 is drawn out from the supporter of the beekeeping barrel 2, there is also a more convenient effect when drawing out the beekeeping barrel 2.

At this time, guide pieces are provided at both ends of the mounting support bar 36 in a perpendicular direction, and the guide pieces may be coupled with both left and right side frame portions of the beekeeping barrel shelf 30 by a movement guide means such as a guide rail. Further, the mounting support bar 36 may be coupled to the supporter of the beekeeping barrel 2 by a fixing means. Elongated holes extended in a front and rear direction are provided at left and right guide pieces of the mounting support bar 36, and fastening bolts coupled to the elongated holes are fastened to the left and right side panels of the supporter of the beekeeping barrel 2. When the fixing bolt is fastened to the side frame portion in a state in which the mounting support bar 36 is opened at the front or rear side of the supporter of the beekeeping barrel 2, a head portion of the fixing bolt may press and fix the guide piece of the mounting support bar 36 to the side frame portion of the supporter of the beekeeping barrel 2. When the fixing bolt is fastened to the side frame portion in a state in which the mounting support bar 36 is narrowed at the front or rear side of the supporter of the beekeeping barrel 2 (the mounting support bar 36 is narrowed to an original position), the head portion of the fixing bolt may press and fix the guide piece of the mounting support bar 36 to the side frame portion of the supporter of the beekeeping barrel 2. The elongated hole and the fixing bolt of the guide piece may be the fixing means. Similarly, any means for keeping the mounting support bar 36 in the opened and narrowed states may all be adopted as the fastening means.

In addition, in the present invention, when the beekeeping is performed by unfolding the pair of shelf frames 20, four passages are formed at least between the beekeeping barrels 2, so that the operator may roam through the passages and perform the beekeeping, thereby enhancing more convenience in the beekeeping operation.

In addition, when the bees enter the beekeeping barrel 2, the bees do not interfere with each other when the bees fly between the passages secured between the beekeeping barrels 2 arranged in a plurality of columns, so that the beekeeping operation may be performed more smoothly.

When the door panel 18 provided on the shelf frame 20 is unfolded with respect to the hinge and an auxiliary panel hinged to the front and rear ends of the bottom portion of the container body 10 is unfolded, passages are formed even by the door panel 18 and the auxiliary panel, thereby enhancing more the convenience of the beekeeping operation.

In addition, the pair of shelf frames 20 may be unfolded while the beekeeping container of the present invention is placed on the vehicle, and the beekeeping may be performed in such a state. In this case, the length of the extendable leg LG provided on the shelf frame 20 is increased so that the leg LG supports the shelf frame 20 from below and the leg LG is supported on the ground, thereby preventing the shelf frame 20 from being sagged downward by the load of the beekeeping barrel 2. The present invention may be installed on the ground of a beekeeping paper to perform the beekeeping, the beekeeping container of the present invention is placed on the vehicle to perform the beekeeping, and even when the present invention is placed on the luggage compartment of the vehicle or the like, the unfolded state of the shelf frame 20 may be stably supported by the extendable leg LG. In other words, the present invention is very meaningful in that the present invention is selectively placed on the ground of the beekeeping paper to perform the beekeeping or placed on the vehicle as it is to perform the beekeeping.

The present invention has main features in that while the pair of shelf frames 20 are unfolded, the beekeeping barrel 2 is received in the beekeeping barrel shelf 30 and the shelf frame 20 is fixed to the support frame by the fixing unit by erecting the shelf frame 20 loaded with the beekeeping barrel 2. The supporting frame 14 may have various structures other than the above structure and if the fixing unit may also be fixed to the support frame 14 while the shelf frame 20 is erected, various structures other than the above structure may be adopted.

Figure 17:
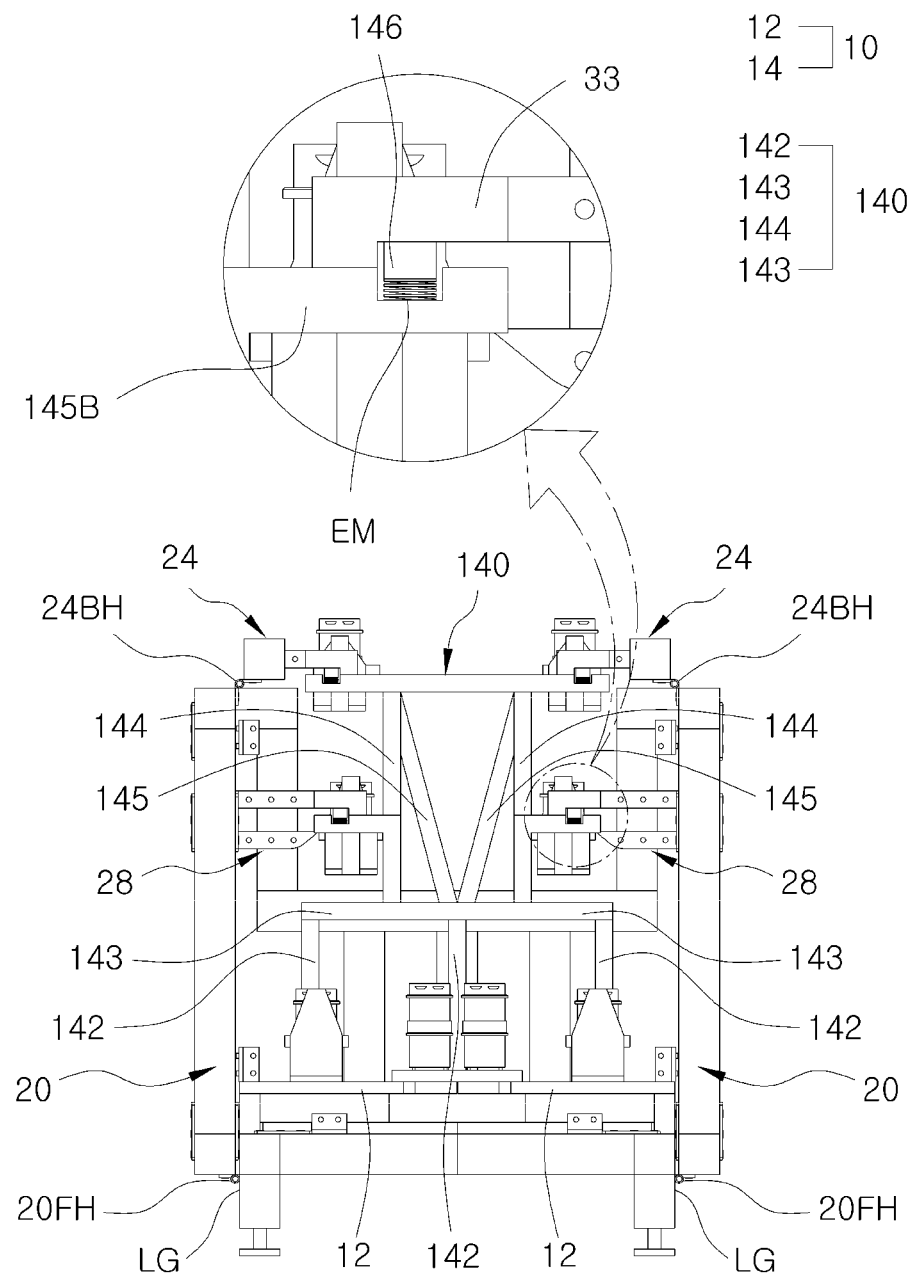
FIG. 17 is a front view showing a modified embodiment of a support frame as a main part of the present invention.

Referring to FIG. 17, in the present invention, the support frame 14 may include a lower support bar 142, a horizontal support bar 143, an upper support bar 144, and a fixation support bar 145.

The lower support bar 142 is vertically supported and erected by the bottom panel 12 of the container body 10 at the lower end thereof. A plurality of lower support bars 142 are arranged side by side in the width direction on the bottom panel 12.

The horizontal support bar 143 is fixed to the upper end of the lower support bar 142. The horizontal support bar 143 is disposed in a direction of left and right side ends of the bottom panel 12. The horizontal support bar 143 is horizontally disposed in the width direction of the bottom panel 12.

The upper support bar 144 is coupled to the horizontal support bar 143. The lower end of the upper support bar 144 is fixed to the horizontal support bar 143. The lower end of the upper support bar 144 is fixed to the horizontal support bar 143. The upper support bar 144 has a structure which is erected in a vertical direction to the horizontal support bar 143. A plurality of upper support bars 144 are arranged in parallel in a direction (width direction) of both ends of the horizontal support bar 143. In the present invention, two upper support bars 144 in parallel are arranged in a direction (width direction) of both ends of the horizontal support bar 143. At this time, a pair of inclined reinforced connection bars 145 may also be connected to the upper support bar 144 and the horizontal support bar 13.

The fixing support bar 145 includes an upper fixing support bar 145A and a lower fixing support bar 145B.

Referring to FIG. 17, the base end of the upper fixing support bar 145A is connected to the upper support bar 144. The upper fixing support bar 145A protrudes in a horizontal direction perpendicular to the upper support bar 144. A locking support piece 146 is further provided in the upper fixing support bar 145A. At this time, the upper fixing support bar 145A is provided with an elevating groove communicating from the upper surface to the inside, and the locking support piece 146 is elevatably coupled to the elevating groove and an elastic member EM such as a spring is interposed between the bottom portion of the elevating groove and the lower end of the locking support piece 146, so that a part of the locking support piece 146 protrudes from the upper surface of the upper fixing support bar 145A by a force elastically pushed by the elastic member EM.

The base end of the lower fixing support bar 145B is connected to the upper support bar 144. The lower fixing support bar 145B is connected to the upper support bar 144 below the upper fixing support bar 145A. The lower fixing support bar 145B protrudes in a horizontal direction perpendicular to the upper support bar 144. A locking support piece 146 is further provided in the lower fixing support bar 145B. The lower fixing support bar 145B is also provided with an elevating groove communicating from the upper surface to the inside, and the locking support piece 146 is elevatably coupled to the elevating groove and an elastic member EM such as a spring is interposed between the bottom portion of the elevating groove and the lower end of the locking support piece 146, so that a part of the locking support piece 146 protrudes from the upper surface of the lower fixing support bar 145B by a force elastically pushed by the elastic member EM. Both the upper fixing support bar 145A and the lower fixing support bar 145B are provided with locking support pieces 146. At this time, levers protruding from the side are provided on the locking support piece 146 of the upper fixing support bar 145A and the locking support piece 146 of the lower fixing support bar 145B so as to press the locking support piece 146 by pressing the levers. When a plurality of support frames 14 are provided in the longitudinal direction of the bottom panel 12, the locking support pieces 146 provided every support frame 14 are connected to each other by a connection bar and a lever is provided in the connection bar, so that the locking support pieces 146 of the support frame 14 may be simultaneously pressed by pressing the levers.

Referring to FIG. 17, in the present invention, a locking piece is provided on the lower surface of the connection member 33. The locking piece protrudes from the lower surface adjacent to the front end of the connection member 33. A step is formed on the lower surface of the connection member 33 by the locking piece.

While the pair of shelf frames 20 are erected, the lower surface of the connection member 33 faces the upper surface of the bottom panel 12 and the locking piece on the lower surface of the connection member 33 is locked to the locking support piece 146 provided in the support frame 14 to be kept in the erected state in the shelf frame 20. While the shelf frame 20 is erected, the shelf frame 20 is locked to the locking support piece 146 provided above in the support frame 14 of the locking piece provide in the connection member 33 on the upper layer and the locking support piece 146 provided below in the support frame 14 of the locking piece provide in the connection member 33 on the lower layer. While the shelf frame 20 is erected, the locking piece of the connection member 33 presses the locking support piece 146 provided in the support frame 14, and while the locking support piece 146 is pressed, the elastic member EM is compressed. In this state, when the shelf frame 20 is erected continuously, the locking piece of the connection member 33 deviates from the locking support piece 146, and when the locking piece of the connection member 33 deviates from the locking support piece 146, the elastic member EM is unfolded again and the locking support piece 146 is elevated upward by the elasticity to lock the locking piece of the connection member 33 to the locking support piece 146. Accordingly, while the shelf frame 20 is completely erected, the locking support piece 146 provided in the support frame 14 locks and holds the connection member 33 provided in the shelf frame 20 to be kept in the erected state in the shelf frame 20. On the other hand, when the shelf frame 20 is to be unfolded in the horizontal direction again, the locking support piece 146 is pushed. Then, the locking support piece 146 is pressed to deviate from the area where the locking piece on the lower surface of the connection member 33 is locked, so that the locking piece on the lower surface of the connection member 33 is not locked to the locking support piece 146 and the shelf frame may be unfolded in the horizontal direction again.

In the present invention, a fixing unit may be a cylinder. A hydraulic cylinder may be adopted as the fixing unit. In the present invention, the cylinder may include a first cylinder and a second cylinder.

The first cylinder is connected between the support frame 14 and the shelf frame 20. The base end of the first cylinder is connected to the support frame 14 by a hinge portion and a first cylinder rod drawn out from the front end of the first cylinder has a structure connected to the shelf frame 20 by a hinge portion.

The second cylinder is connected between the shelf frame 20 and the rotation bar 24. The base end of the second cylinder is connected to the shelf frame 20 by a hinge portion and a second cylinder rod drawn out from the front end of the second cylinder has a structure connected to the rotation bar 24 by a hinge portion.

Therefore, while the pair of shelf frames 20 are unfolded horizontally, the first cylinder rod of the first cylinder is extended and the second cylinder rod of the second cylinder is also extended.

Meanwhile, when the first cylinder rod of the first cylinder and the second cylinder rod of the second cylinder are retracted (contracted), the rotation bar 24 is erected by the second cylinder and the shelf frame 20 may be erected by the first cylinder. At this time, the second cylinder rod of the second cylinder is retracted first so that the rotation bar 20 and the beekeeping barrel shelf 30 mounted thereon are erected before the shelf frame 20, and then the first cylinder rod of the first cylinder is retracted so that the pair of shelf frames 20 are erected. The first cylinder and the second cylinder maintain the pair of shelf frames 20 in the erected state. In addition, the first cylinder and the second cylinder maintain the shelf frame 20 in an unfolded state even when the pair of shelf frames 20 are unfolded horizontally.

Figure 16:
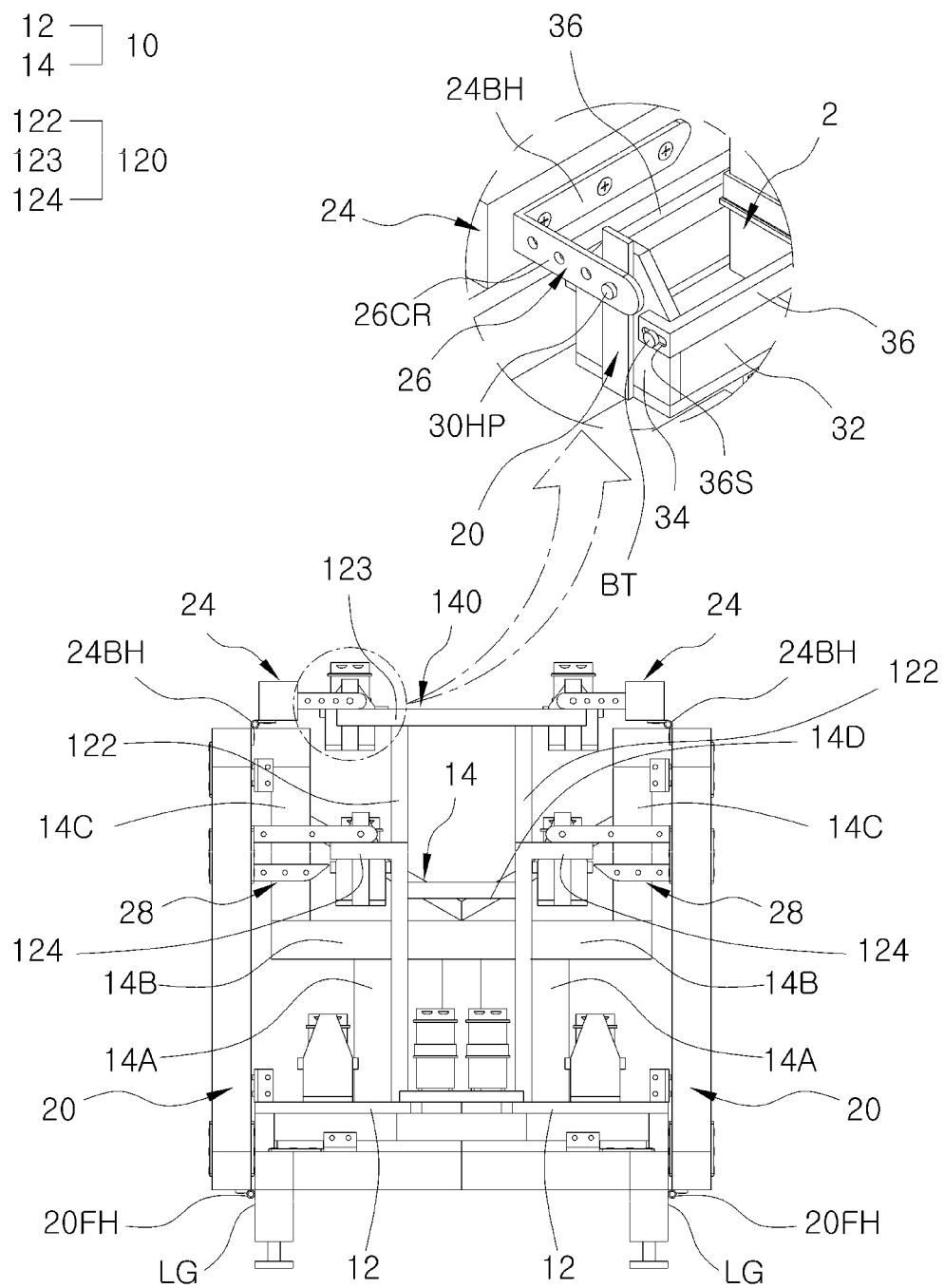
FIG. 16 is a front view showing an auxiliary frame as another main part of the present invention.

In addition, referring to FIG. 16, the present invention may further include an auxiliary frame 120. The auxiliary frame 120 includes an auxiliary frame bar 122, an upper support bar 123, and a lower support bar 124. An auxiliary reinforcing bar 125 may be included in the auxiliary frame 120.

The lower end of the auxiliary frame bar 122 is supported by the bottom panel 12 to be disposed in a vertical direction. A pair of auxiliary frame bars 112 are arranged in parallel in a width direction of the bottom panel 12.

The upper support bar 123 protrudes from the side of the auxiliary frame bar 122. The base end of the upper support bar 123 is connected to the auxiliary frame bar 122 and protrudes from the side of the auxiliary frame bar 123. The upper support bar 123 is disposed in the horizontal direction.

The lower support bar 124 protrudes the side of the auxiliary frame bar 122. The lower support bar 124 is disposed below the upper support bar 123. The base end of the lower support bar 124 is connected to the auxiliary frame bar 122 and protrudes from the side of the auxiliary frame bar 123. The lower support bar 124 is disposed in the horizontal direction.

Meanwhile, the pair of auxiliary frame bars 122 may be connected to each other by the auxiliary reinforcing bar 125 to reinforce the connection structure between the pair of auxiliary frame bars 122.

The auxiliary frame 120 is vertically erected to the front end and the rear end of the bottom panel 12 of the container body 10. It is natural that the number of auxiliary frames 120 may be reduced.

When the pair of shelf frames 20 are erected, the upper support bar 123 supports the shelf bracket 26 coupled with the beekeeping barrel shelf 30 on the upper layer of the shelf frame 20 from the bottom, and the lower support bar 124 supports the shelf bracket 26 coupled with the beekeeping barrel shelf 30 on the lower layer of the shelf frame 20 from the bottom.

Accordingly, since the beekeeping barrel shelf 30 of the shelf frame 20 is supported by the auxiliary frame 120, the load of the beekeeping barrel 2 or the like received in the beekeeping barrel shelf 30 is sufficiently and more firmly supported. Since the beekeeping barrel shelf 30 and the beekeeping barrel 2 provided in the shelf frame 20 are supported by the auxiliary frame 120, the beekeeping barrel shelf 30 and the beekeeping barrel 2 may be more structurally stabilized when being erected on the shelf frame 20.

On the other hand, the slide shelf 16 is configured to be drawn out by a drawing device. The drawing device may be a cylinder. The cylinder may adopt a hydraulic cylinder.

The base end of the cylinder is connected to the bottom panel 12 of the container body 10 and the cylinder rod drawn out to the front end of the cylinder is connected to the slide shelf 16, and thus the cylinder rod of the cylinder is extended so that the slide shelf 16 may be drawn out along the bottom panel 12. When the drawing device is used, the drawing operation of the slide shelf 16 is more smoothly facilitated. At this time, it should be understood that the drawing device may adopt any device capable of drawing out the slide shelf 16 in addition to the cylinder.

Figure 18:
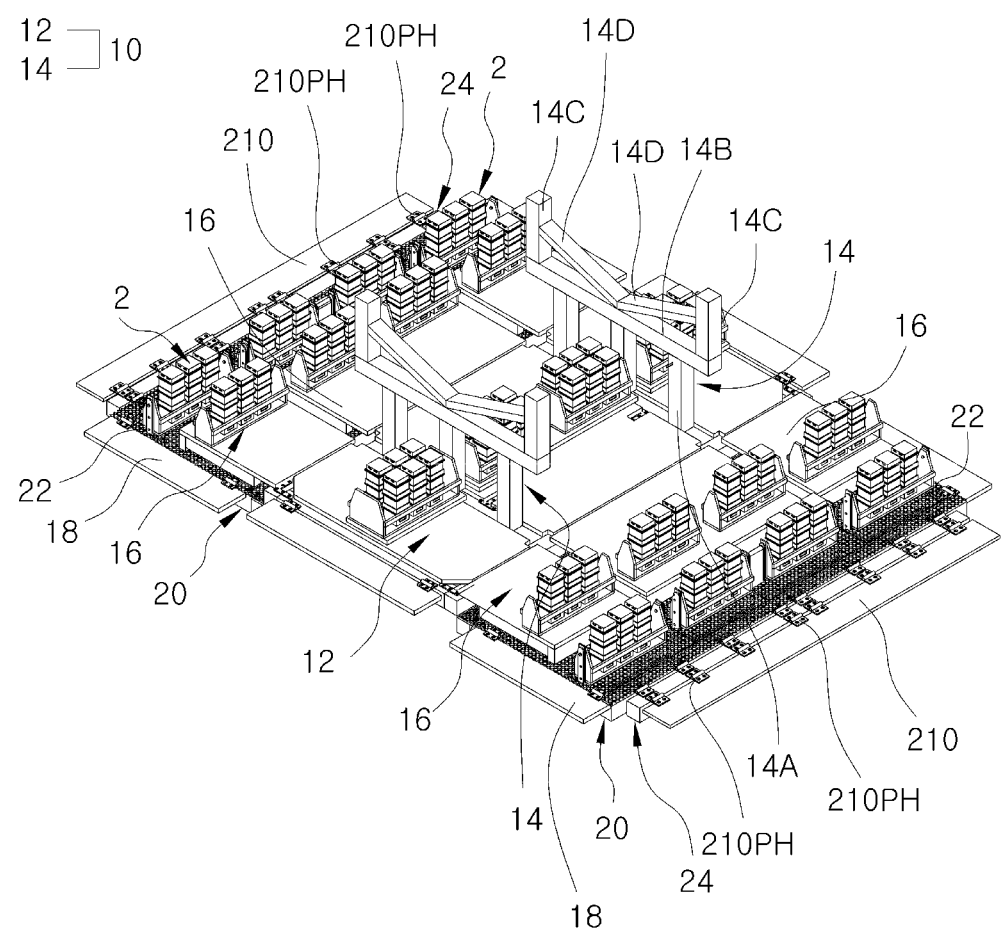
FIG. 18 is a perspective view showing a state in which a shelf frame as a main part is unfolded in a beekeeping container according to another embodiment of the present invention and a perspective view showing a state in which a three-phase beekeeping barrel is installed.

Meanwhile, referring to FIG. 18, in the present invention, a panel 210 may be connected to the upper ends of the pair of shelf frames 20 through a panel hinge portion 210PH. When the beekeeping barrel 2 is formed in two stages, the beekeeping barrel 2 is referred to as stepped phases, and when the beekeeping barrel 2 is formed in three stages, the beekeeping barrel 2 is referred to as a three phases. When the three-phase beekeeping barrel 2 is received, the beekeeping barrel shelf 30 is provided in only one layer on the shelf frame 20, and a three-phase beekeeping barrel 2 is received in the beekeeping barrel shelves 30 on one layer.

While the shelf frame 20 received in the three-phase beekeeping barrel 2 and the beekeeping barrel shelf 30 is erected, the panel 210 is horizontally folded inward with respect to the panel hinge portion 210PH.

As shown in FIG. 18, while the shelf frame 20 received in the three-phase beekeeping barrel 2 and the beekeeping barrel shelf 30 is unfolded, the panel 210 is horizontally unfolded outward with respect to the panel hinge portion 210PH. The panel 210 forms a passage around the shelf frame 20 so that the operator easily moves. In addition, even when bees enter the beekeeping barrel 2 by securing the passage by the panel 210, it is possible to more clearly prevent the bees from being disturbed in a flying passage even when the bees fly.

Hereinabove, a specific embodiment of the present invention has been described. However, it will be understood by a person with ordinary skill in the technical field to which the present invention pertains that the spirit and scope of the present invention are not limited to the specific embodiments, and various corrections and modifications may be made within the scope without departing from the subject matter of the present invention.

Therefore, the embodiments disclosed above are set forth to provide a complete understanding of the scope of the invention to a person with ordinary skill in the technical field to which the present invention pertains, it should be understood that the embodiments are described for illustration in all aspects and are not limited, and the present invention will only be defined by the scope of the claims.

INDUSTRIAL AVAILABILITY

The present invention overcomes various limitations in carrying a desired number of beekeeping barrels due to a lack of a loading space and solves the problems causing inconvenience of the operation and waste of the installation time of the beekeeping barrels, and thus the present invention has the industrial availability

| [Explanation of Reference Numerals and Symbols] | |
|---|---|
| 2. Beekeeping barrel | 10. Container body |
| 12. Bottom panel | 14. Support frame |
| 14A. Lower support bar | 14B. Horizontal support bar |
| 14C. Upper support bar | 14D. Reinforced connection bar |
| 16. Slide shelf | 18. Door |
| 20. Shelf frame | 22. Frame panel |
| 24. Rotation bar | 26. Shelf bracket |
| 28. Fixing bracket | 30. Beekeeping barrel shelf |
| 32. Barrel support plate | 34. Side support piece |
| 36. Mounting support bar | |

The invention claimed is:

1. A beekeeping container comprising:
a pair of shelf frames, a shelf frame of the pair is rotatably coupled to a container body via a frame hinge portion; and
a beekeeping barrel shelf which is coupled to a hinge portion to be erected in a vertical direction based on the hinge portion when the shelf frame is unfolded and erected based on the frame hinge portion,
wherein the shelf frames is provided on both left and right sides of the container body, respectively, the pair of shelf frames are provided on the container body, and the beekeeping barrel shelf is mounted on the pair of shelf frames via the hinge portion,
wherein the beekeeping barrel shelf is mounted on the shelf frame in multiple stages,
wherein a bottom panel is provided in the container body, a receiving space in which a beekeeping barrel is mounted on the bottom space is secured, and the beekeeping barrel shelf is disposed above the beekeeping barrel received in the receiving space,
wherein a rotation bar is connected to an upper end of the shelf frame by a bar hinge portion,
wherein a plurality of shelf brackets are connected to the rotation bar, each of the plurality of shelf brackets is composed of a connection bracket piece and a cross bracket piece, and the connection bracket piece is connected to the rotation bar,
wherein the cross bracket piece is coupled to a side support piece of the beekeeping barrel shelf via the hinge portion,
wherein as the rotation bar is rotatably coupled to the upper end of the shelf frame, the rotation bar is rotated inward of the shelf frame upon the shelf frame being erected based on the frame hinge portion, and the rotation bar is rotated outward to be unfolded upon the shelf frame being unfolded.

2. The beekeeping container of claim 1, wherein a slide shelf drawn out from the receiving space secured above the bottom panel is further provided in the container body and the beekeeping barrel is mounted on the slide shelf.

3. The beekeeping container of claim 1, wherein a panel is connected to the upper end of the pair of shelf frames via a panel hinge portion.

* * * * *